(12) United States Patent
Fowler et al.

(10) Patent No.: US 11,871,129 B2
(45) Date of Patent: Jan. 9, 2024

(54) SIGNAL-CHARGE ESTIMATOR AND METHOD

(71) Applicant: OmniVision Technologies, Inc., Santa Clara, CA (US)

(72) Inventors: Boyd Fowler, Sunnyvale, CA (US); Andreas Suess, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/869,552

(22) Filed: Jul. 20, 2022

(65) Prior Publication Data

US 2023/0224603 A1 Jul. 13, 2023

Related U.S. Application Data

(60) Provisional application No. 63/298,450, filed on Jan. 11, 2022.

(51) Int. Cl.
*H04N 25/67* (2023.01)
*H04N 25/671* (2023.01)
*G06F 17/12* (2006.01)
*H04N 25/772* (2023.01)

(52) U.S. Cl.
CPC ........... *H04N 25/671* (2023.01); *G06F 17/12* (2013.01); *H04N 25/772* (2023.01)

(58) Field of Classification Search
CPC ..... H04N 25/671; H04N 25/772; G06F 17/12
See application file for complete search history.

(56) References Cited

U.S. PATENT DOCUMENTS

2016/0323524 A1* 11/2016 Smith .................. H04N 23/741

OTHER PUBLICATIONS

Simbeni et al., "Optimal Filter Design Considering Charge Transfer Characteristics for CCD Readout", 2019 Argentine Conference on Electronics—CAE, 6 pages.
Kawai et al., "Effectiveness of a correlated multiple sampling differential averager for reducing 1/f noise", IEICE Electronics Express, vol. 2, No. 13, 2005, pp. 379-383.
Fowler et al., "Noise reduction strategy for hybrid IR focal-plane arrays", Proceedings of SPIE vol. 1541 Infrared Sensors: Detectors, Electronics and Signal Processing, 1991, 8 pages.
Fowler et al., "Demonstration of an Algorithm for Read-Noise Reduction in Infrared Arrays", The Astrophysical Journal, 353, Apr. 10, 1990, L33-L34.
Clapp et al., "DCDS weighted averaging theory and development for improved noise filtering in scientific CCD applications", Proceedings of SPIE vol. 9915, High Energy, Optical, and Infrared Detectors for Astronomy VII, 2016, 15 pages.

(Continued)

*Primary Examiner* — Ahmed A Berhan
*Assistant Examiner* — Fayez A Bhuiyan
(74) *Attorney, Agent, or Firm* — COZEN O'CONNOR

(57) ABSTRACT

A method for estimating a signal charge collected by a pixel of an image sensor includes determining an average bias that depends on the pixel's floating-diffusion dark current and pixel-sampling period. The method also includes determining a signal-charge estimate as the average bias subtracted from a difference between a weighted sum of a plurality of N multiple-sampling values each multiplied by a respective one of a plurality of N sample-weights.

17 Claims, 10 Drawing Sheets

(56) References Cited

OTHER PUBLICATIONS

Ispasoiu et al., "Model-Free Power-Spectral-Density Estimation for Low-Light-Level CMOS Imaging Sensors", International Image Sensors Workshop, Paper 16, 2009, 4 pages.
White et al., "Characterization of Surface Channel CCD Image Arrays at Low Light Levels", IEEE J. Solid-State Circuits, vol. SC-9, Feb. 1974, 13 pages.
Wen, "Design and Operation of a Floating Gate Amplifier", IEEE Journal of Solid-State Circuits, vol. 9, No. 6, Dec. 1974, 5 pages.
Janesick et al., "New advancements in charge coupled device technology: subelectron noise and 4096 × 4096 pixel CCDs", Proceedings of SPIE, vol. 1242, Charge-Coupled Devices and Solid State Optical Sensors, 1990, 16 pages.
Krymski, "Global Shutter Pixel with Floating Storage Gate", IISW, 2013, 4 pages.
Stefanov et al., Simulations and Design of a Single-Photon CMOS Imaging Pixel Using Multiple Non-Destructive Signal Sampling. *Sensors* 2020, 20, 2031, 12 pages.
Lutz et al., "The DEPFET Sensor-Amplifier Structure: A Method to Beat 1/f Noise and Reach Sub-Electron Noise in Pixel Detectors" *Sensors* 2016, 16, 608, 14 pages.
Gach et al. "A New Digital CCD Readout Technique for Ultra-Low-Noise CCDs" Publications of the Astronomical Society of the Pacific, 115, Sep. 2003, pp. 1068-1071.
Stefanov et al., "Optimal digital correlated double sampling for CCD signals", Electronics Letters, vol. 50, No. 14, Jul. 3, 2014, 2 pages.
Stefanov, "Digital CDS for Image Sensors with Dominant White and 1/F Noise". Journal of Instrumentation, 10(4), article No. P04003, 2015, 20 pages.
Moroni et al., Sub-electron readout noise in a Skipper CCD fabricated on high resistivity silicon. Exp Astron 34, 2012, pp. 43-64.
Alessandri et al., "Optimal CCD readout by digital correlated double sampling" MNRAS, 455, 2016, pp. 1443-1450.
Suess et al., "Time Domain Noise Analysis of Oversampled CMOS Image Sensors" IEEE Transactions on Electron Devices, vol. 69, No. 6, Jun. 2022, 6 pages.

* cited by examiner

SIGNAL-CHARGE ESTIMATOR AND METHOD

RELATED APPLICATIONS

This application claims priority to U.S. Provisional Patent Application No. 63/298,450 filed Jan. 11, 2022, the entire content of which is incorporated herein by reference.

BACKGROUND

Read noise is a fundamental limitation for CMOS image sensors (CIS) under low light conditions. The research for uncooled and fast noise reduction is an ongoing effort finding relevance in several application spaces such as security and surveillance, scientific imaging, medical imaging, and automotive imaging.

SUMMARY OF THE EMBODIMENTS

Embodiments disclosed herein include noise reduction techniques based on oversampling to that improve accuracy of electron counting in CMOS image sensors. In a first aspect, a method for estimating a signal charge collected by a pixel of an image sensor is disclosed. The method includes determining an average bias that depends on the pixel's floating-diffusion dark current and pixel-sampling period. The method also includes determining a signal-charge estimate as the average bias subtracted from a difference between a weighted sum of a plurality of N multiple-sampling values each multiplied by a respective one of a plurality of N sample-weights.

In a second aspect, an image sensor includes a pixel array and circuitry communicatively coupled thereto. The circuitry estimates a signal charge collected by a pixel of the pixel array by executing the method of the first aspect.

DETAILED DESCRIPTION OF THE EMBODIMENTS

1. Introduction

Embodiments disclosed herein include noise reduction techniques based on oversampling that improve accuracy of electron counting in CMOS image sensors. Correlated multiple sampling (CMS) is an oversampling technique in which a signal is measured, typically using a floating diffusion (FD) amplifier, a source-follower, and a column-level analog to digital converter (ADC). In CMS multiple reset and signal-samples are combined to yield an average low-noise estimate of the underlying signal. Noise-optimized CMS (NOCMS) uses the underlying noise statistics of the data to compute a weighted rather than a simple arithmetic average.

The next two techniques assume that charge can be moved at the pixel level in such a way that successive non-destructive measurements of reset and signal level can be taken repeatedly, which reduces the correlation time between reset and signal-samples. Floating gate and skipper amplifiers are examples of circuitry enabling this type of charge transfer. These two additional readout techniques are skipper multiple sampling (SMS) and noise optimized skipper multiple sampling (NOSMS). The only difference between the two techniques is that NOSMS uses a weighted sum based on the noise statistics of the data just like NOCMS.

For CMS, the last reset and first signal values may be weighted more due to their potentially higher correlations. Optimizing weights of CMS systems may further reduce the noise. Such optimization may employ directly estimating model-free, pixel-wise auto-correlation functions and use them to determine optimal weights for each pixel.

Embodiments disclosed herein compute globally optimal weights, which saves memory and computation cost. Furthermore, we employ physically motivated noise models and estimate model parameters of the resulting auto-correlation and auto-covariance functions to yield a more robust estimate of the signal charge generated by a CMOS image sensor pixel. We present additional details on how the model parameters were estimated as well as how the final results were computed in comparison to previous work. In addition, embodiments disclosed herein employ a methodology to yield optimal weights without the need for Monte-Carlo Simulation.

In Section 2 we describe our simplified time domain readout model and derive the read noise for oversampled systems. In Section 3 optimal weights for NOCMS and NOSMS are derived. In Section 4 we present how we derive noise models based on measurements of two sensors and in Section 5 we present total temporal and spatial noise as a function of oversampling ratio for the four techniques based on the models presented in Section 4.

2. Oversampling Theory

Figure 1:
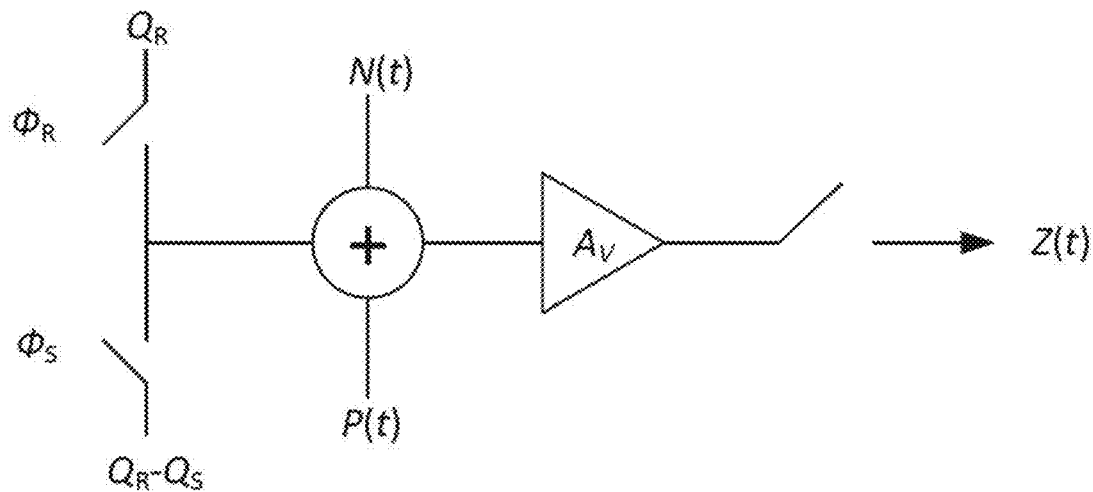
FIG. 1 is a simplified linearized block diagram of a CIS readout from an image-sensor pixel to an analog-to-digital converter (ADC) of the image sensor, in embodiments.

FIG. 1 shows a simplified linearized block diagram of a CIS readout from the pixel to the ADC. Here, $Z(t)$ denotes the ADC sample, $Q_R$, $Q_S$ are the input referred reset and signal charges, $\Phi_R$, $\Phi_S$ are the signals determining if a reset or signal-sample is measured, $N(t)$ and $P(t)$ are random processes modeling read noise and FD leakage, and $A_V$ is the conversion gain. Output signal Z is connected to either reset charge $Q_R$ through $\Phi_R$ or to signal charge $Q_R - Q_S$ through $\Phi_S$. Reset charge, signal charge, equivalent input-referred noise charge N, and FD leakage charge P are all amplified by the conversion gain $A_V$ to yield Z.

The signal value Z depending on $\Phi_R$ being activated during a reset time $t \in T_R$ and $\Phi_S$ being activated during a signal time $t \in T_S$ is given as:

$$Z(t) = A_V \cdot \begin{cases} N(t) - P(t) + Q_R & \text{for } t \in T_R \\ N(t) - P(t) + Q_R - Q_S & \text{for } t \in T_S \end{cases}. \quad (1)$$

Combining a reset-sample and a signal-sample a difference pair $X_i$ can be defined as:

$$X_i = A_V^{-1}[Z(t_{R-i}) - Z(t_{S-i})], \, t_{S-i} \in T_S, \, t_{R-i} \in T_R \quad (2)$$
$$= Q_S + P(t_{S-i}) - P(t_{R-i}) + N(t_{R-i}) - N(t_{S-i}).$$

These difference pairs then can be combined to a weighted average Y acting as an estimator of $Q_S$ $$Y = \Sigma_{i=1}^N \alpha_i \cdot X_i, \quad (3)$$

whereas, here, it is not guaranteed that Y is bias-free.

Figure 2:
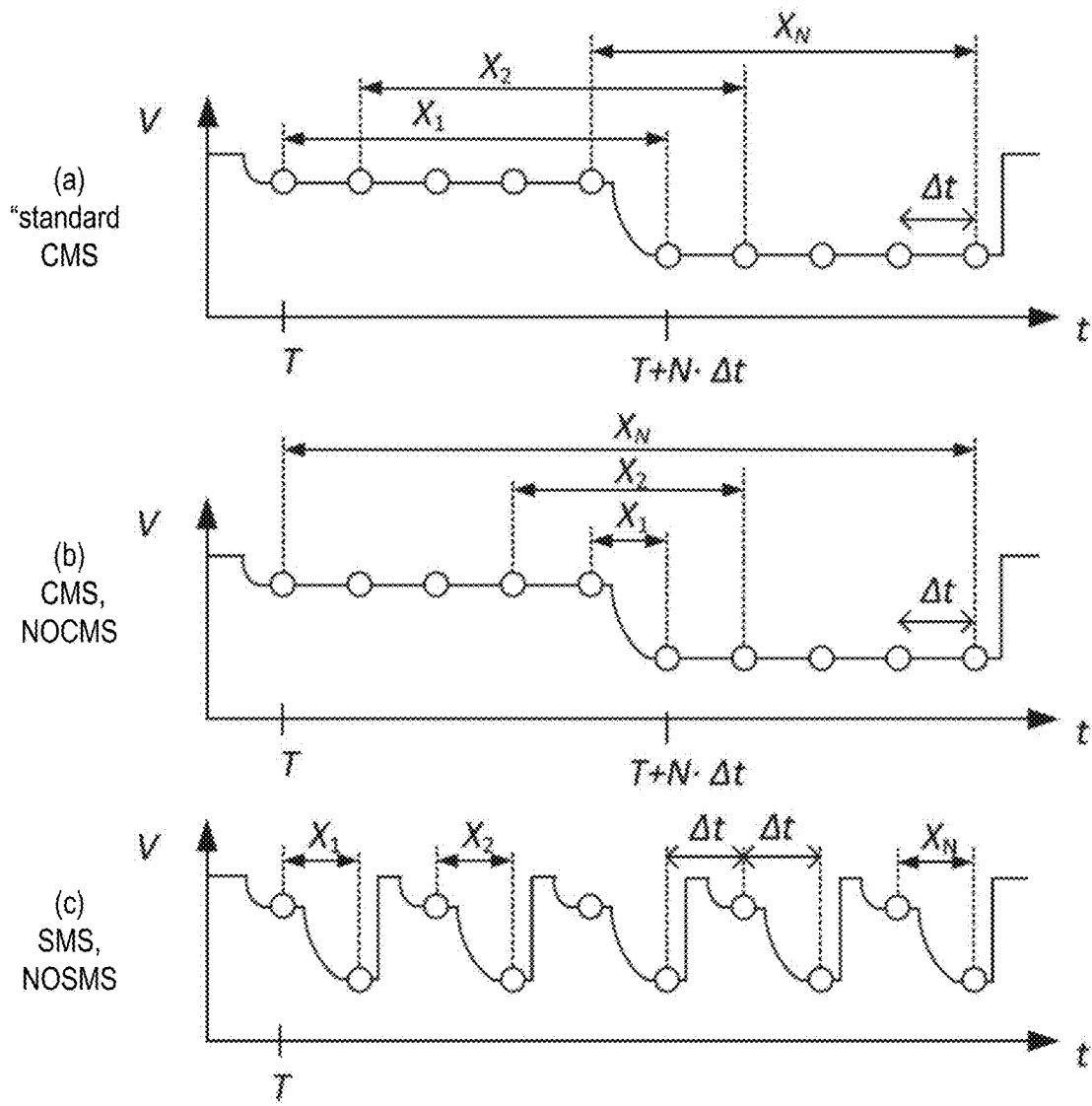
FIG. 2 illustrates example oversampling waveforms for different oversampling techniques executable by an image sensor that includes the pixel of FIG. 1, in embodiments.

FIG. 2 illustrates oversampling waveforms for CMS, NOCMS, SMS and NOSMS. Note that pairings $X_i$ describe the difference of reset and signal-sample. The pairing of waveform a) has constant correlation time (N·Δt), whereas the pairing of waveform b) distinguishes correlation time between signal and reset-samples.

Part (a) of FIG. 2 illustrates an example CMS voltage level waveform at the input of the column level ADC. The circles represent the ADC sample points, Δt determines the time between samples, T determines the time of the first sample, $X_i$ describes a pairing of reset and signal-samples according to eq. (2), and N determines the oversampling count. The CMS samples may be interpreted in pairs of reset and signal-samples, whereas here for example, the first reset-sample is paired with the first signal-sample and so on. The pairing presented in (b) allows to give emphasis to the difference pairs depending on how close in time and correspondingly, how correlated they are. Pairing (a) does not enable such emphasis, as the correlation time for pairing a) is constant (N·Δt) as illustrated in FIG. 2. Note that in the case where all weights $\alpha_i = 1/N$, both methods are equal from a stochastic point of view. Hence, we focus on pairing (b) for the remainder of this disclosure for both CMS and NOCMS. Part (c) illustrates the voltage waveforms for SMS and NOSMS. One can observe the alternating samples of reset and signal values as they can be realized non-destructively using the floating-gate amplifier output structure.

$T_R$ and $T_S$ being the sets of all reset and signal time-points used in eq. (1) result from the pairings b) and c) illustrated in FIG. 2:

$$T_S = \begin{cases} \{t_{S-i} = T + (N+i-1) \cdot \Delta t \\ |i = \{1, \ldots, N\}\} \text{ for CMS, NOCMS} \\ \{t_{S-i} = T + (2i-1) \cdot \Delta t \\ |i = \{1, \ldots, N\}\} \text{ for SMS, NOSMS} \end{cases} \quad (4)$$

$$T_R = \begin{cases} \{t_{R-i} = T + (N-i) \cdot \Delta t \\ |i = \{1, \ldots, N\}\} \text{ for CMS, NOCMS} \\ \{t_{R-i} = T + (2i-2) \cdot \Delta t \\ |i = \{1, \ldots, N\}\} \text{ for SMS, NOSMS} \end{cases} \quad (5)$$

Using eqs. (2), (4), and (5), one can directly deduce that:

$$E[X_i | p_{m,n}] = Q_S + \frac{I_{d|p_{m,n}}}{q} \cdot \Delta t \cdot \begin{cases} 2i-1 & \text{for CMS, NOCMS} \\ 1 & \text{for SMS, NOSMS} \end{cases} \quad (6)$$

where $E[\cdot | p_{m,n}]$ denotes conditional expectation of a pixel at location (m, n), q is the elementary charge, and $I_{d|p_{m,n}}$ is the average FD leakage current of pixel m, n. This results in a dark current related bias $b_{|p_{m,n}}$ in $Y = \Sigma_{i=1}^N \alpha_i \cdot X_i$ which for NOCMS also depends on the choice of weights α. Forcing $\Sigma_{i=1}^N \alpha_i = 1$ and subtracting the average bias $E[b] = E[b_{|p_{m,n}}]$ from Y yields a bias-free estimator $\tilde{Y}$ of signal charge $Q_S$:

$$\tilde{Y} = \left(\sum_{i=1}^N \alpha_i X_i\right) - E[b] \quad (7)$$

$$b_{|p_{m,n}} = \begin{cases} \left(\frac{I_{d|p_{m,n}}}{q}\right) \cdot \Delta t \cdot N & \text{for CMS} \\ \left(\frac{I_{d|p_{m,n}}}{q}\right) \cdot \Delta t \cdot \left[\sum_{i=1}^N \alpha_i \cdot (2i-1)\right] & \\ & \text{for NOCMS} \\ \left(\frac{I_{d|p_{m,n}}}{q}\right) \cdot \Delta t & \text{for SMS, NOSMS} \end{cases} \quad (8)$$

$$E[\tilde{Y} | p_{m,n}] = Q_S + b_{|p_{m,n}} - E[b] \quad (9)$$

$$E[\tilde{Y}] = E[E(\tilde{Y} | p_{m,n})]$$
$$= Q_S - E[b] + \underbrace{E[b_{|p_{m,n}}]}_{=E[b]} = Q_S \quad (10)$$

with $E[\cdot]$ as the total expectation.

The error between $\tilde{Y}$ and the true value of signal charge $Q_S$ can be measured quadratically:

$$E[(Y - Q_S)^2] = \sigma_{\tilde{Y}}^2 = \sigma_Y^2 \quad (11)$$
$$= \left(\sum_{i=1}^N \sum_{j=1}^N \alpha_i \cdot \alpha_j \cdot R_{X-Q}(i, j)\right) - \left(\sum_{i=1}^N \alpha_i \cdot E[X_i]\right)^2$$

where $\sigma_Y^2$ and $\sigma_{\tilde{Y}}^2$ are the total variances of Y and $\tilde{Y}$, and $R_{X-Q}(i, j) = E[E[X_i \cdot X_j | p_{m,n}]]$ is the expected autocorrelation function across all pixels. Section 4 addresses how we model and estimate $R_{X-Q}$ and $I_{d|p_{m,n}}$ which explains $E[X_i] = E[E[X_i | p_{m,n}]]$ through eq. (6).

3. Noise Optimization of CMS and SMS

Using eq. (2), one can derive the relation between the $Q_S$-dependent $R_{X-Q}$ and a signal-free $R_X$:

$$R_{X-Q}(i, j) = E[X(i) \cdot X(j)] \quad (12)$$
$$= 2 \cdot Q_S \cdot (Q_S + E[b]) + R_X(i, j).$$

With that follows the important observation that the objective function of eq. (11) yields weights α* that are optimal irrespective of $Q_S$:

$$\sigma_{\tilde{Y}}^2 = E[Y^2] - (E[b] + Q_S)^2 \quad (13)$$
$$= \sum_{i=1}^N \sum_{j=1}^N \alpha_i \cdot \alpha_j \cdot R_{X-Q}(i, j) - (E[b] + Q_S)^2$$
$$= E[Y_{|Q_S=0}^2] - (E[b])^2 + Q_S^2.$$

-continued

With:

$$\alpha[\xi] = \xi \cdot \alpha_1 + [1-\xi] \cdot \alpha_2 \qquad (14)$$

$$\forall\, \alpha_1, \alpha_2 \in \mathbb{R}^N, \alpha_1 \neq \alpha_2, \xi \in (0,1)$$

one can show that $E[\tilde{Y}^2]$ is convex because:

$$0 \geq E\left[\tilde{Y}^2(\alpha[\xi])\right] - \xi \cdot E\left[\tilde{Y}^2(\alpha_1)\right] - [1-\xi] \cdot E\left[\tilde{Y}^2(\alpha_2)\right] = \underbrace{[\xi^2-\xi]}_{<0\,\forall\xi\in(0,1)} \cdot \underbrace{(\alpha_1-\alpha_2)^T \mathrm{cov}_X(\alpha_1-\alpha_2)}_{=E[([\alpha_1-\alpha_2]^T X)^2]\geq 0} \qquad (15)$$

holds. The equality constraint $1^T\alpha=1$ is affine and, hence, also convex. Thus, it follows that the optimization expression of eq. (16) describes a minimum $\alpha^*$ which we compute using the Lagrange function $L(\alpha, \lambda)$ with the Lagrange multiplier $\lambda$:

$$\alpha^* = \underset{\alpha \in \chi}{\mathrm{argmin}}\, E\left[\tilde{Y}^2\right],\ \chi = \left\{ \alpha \in \mathbb{R}^N \,\bigg|\, \sum_{i=1}^N \alpha_i = 1 \right\} \qquad (16)$$

$$L(\alpha, \lambda) = E\left[\tilde{Y}^2\right] + \lambda \cdot \left( \sum_{i=1}^N \alpha_i - 1 \right) \qquad (17)$$

$$\frac{\partial L}{\partial \alpha_i} = E\left[ 2 \cdot (Y - E[b]) \cdot \frac{\partial}{\partial \alpha_i}(Y - E[b]) \right] + \lambda \qquad (18)$$
$$= 2 \cdot E[Y \cdot X_i] - 2 \cdot E[b] \cdot E[X_i] + \lambda$$

Now writing out $Y = \sum_{i=1}^N \alpha_i \cdot X_i$ and rearranging the set of equations while using $\mathrm{cov}_X(i,j) = R_X(i,j) - E[X(i)] \cdot E[X(j)]$ one yields:

$$\begin{bmatrix} 0 \\ \vdots \\ 0 \\ 1 \end{bmatrix} = \underbrace{\begin{bmatrix} \mathrm{cov}_X(1,1) & \cdots & \mathrm{cov}_X(1,N) & 1 \\ \vdots & \ddots & \vdots & \vdots \\ \mathrm{cov}_X(N,1) & \cdots & \mathrm{cov}_X(N,N) & 1 \\ 1 & \cdots & 1 & 0 \end{bmatrix}}_{=H_L} \cdot \begin{bmatrix} \alpha_1^* \\ \vdots \\ \alpha_N^* \\ \lambda/2 \end{bmatrix}. \qquad (19)$$

When matrix $H_L$ is invertible (non-singular), then the set of weights $\{\alpha_1^*, \alpha_2^*, \ldots, \alpha_N^*\}$ is a unique global minimum to be determined by solving eq. (19). Note, that eq. (16) through eq. (19) focus on optimizing the global $E[\tilde{Y}]$. Hence, N×N matrix $\mathrm{cov}_X$ is to be interpreted as the total covariance matrix. Matrix $H_L$ may be a Hessian matrix.

4. Underlying Noise Models

Note that from eq. (4) and eq. (5) it follows that:

$$|t_{S-i} - t_{S-j}| = \begin{cases} \Delta t \cdot |j-i| & \text{for } CMS, NOCMS \\ 2 \cdot \Delta t \cdot |j-i| & \text{for } SMS, NOSMS \end{cases} \qquad (20)$$

$$|t_{S-i} - t_{R-j}| = \begin{cases} \Delta t \cdot |j+i-i| & \text{for } CMS, NOCMS \\ \Delta t \cdot |2(j-i)+1| & \text{for } SMS, NOSMS \end{cases}$$

$$|t_{S-i} - t_{S-j}| = |t_{R-i} - t_{R-j}|$$

$$|t_{S-i} - t_{R-j}| = |t_{S-j} - t_{R-i}| \quad \text{for } CMS, NOCMS$$

$$|t_{S-i} - t_{R-j}| \neq |t_{S-j} - t_{R-i}| \quad \text{for } SMS, NOSMS$$

We assume that the read noise can be modeled as a superposition of Lorentzian Random Telegraph Signal (RTS) noise sources with time-constants $\tau_{k|p_{m,n}}$:

$$R_{N|p_{m,n}}(t_1, t_2) = \sum_{k=1}^K c_{k|p_{m,n}} \cdot \exp\left( -\frac{|r_1-r_2|}{\tau_{k|p_{m,n}}} \right). \qquad (21)$$

This inherently assumes that the low-pass-filtering characteristic of the readout circuit has a much smaller time-constant than the Lorentzians. Note, it can be shown that for a first order filter the power spectral density or corresponding autocorrelation function of white noise—e.g., thermal noise—also takes the shape of a Lorentzian, which in this case determines the smallest time-constant.

The autocorrelation function of a shot noise process is given by:

$$R_P(t_1, t_2) = \lambda^2 (t_1-t_0)(t_2-t_0) + \lambda \cdot \min[t_1-t_0, t_2-t_0]. \qquad (22)$$

When $E[N(t_i) \cdot P(t_j)] = 0$, the resulting autocorellation function of a pixel $p_{m,n}$ can now be derived using eqs. (2), (20), (21), (22):

$$R_{X|p_{m,n}}(i,j) = \left(\frac{I_{d|p_{m,n}}}{q}\right)^2 \cdot [2i-1][2j-1] \cdot (\Delta t)^2 + \left(\frac{I_{d|p_{m,n}}}{q}\right) \cdot \Delta t \cdot (2 \cdot \min[i,j] - 1) \qquad (23)$$
$$+ \sum_{k=1}^K c_{k|p_{m,n}} \cdot \left[ 2 \cdot e^{-\frac{\Delta t \cdot |j-i|}{\tau_{k|p_{m,n}}}} - 2 \cdot e^{-\frac{\Delta t \cdot |j+i-1|}{\tau_{k|p_{m,n}}}} \right]$$

for $CMS, NOCMS$ $$= \left(\frac{I_{d|p_{m,n}}}{q}\right)^2 (\Delta t)^2 + \delta(i,j) \cdot \left(\frac{I_{d|p_{m,n}}}{q}\right) \cdot \Delta t$$
$$+ \sum_{k=1}^K c_{k|p_{m,n}} \cdot \left[ 2 \cdot e^{-\frac{2\Delta t \cdot |j-i|}{\tau_{k|p_{m,n}}}} - e^{-\frac{\Delta t \cdot |2(i-j)+1|}{\tau_{k|p_{m,n}}}} - e^{-\frac{\Delta t \cdot |2(j-i)+1|}{\tau_{k|p_{m,n}}}} \right]$$
$$- e^{-\frac{\Delta t \cdot |2(j-i)+1|}{\tau_{k|p_{m,n}}}} \Bigg]$$

for $SMS, NOSMS$ with $t_0 = T$ (cf. FIG. 2), and $\lambda = \frac{I_d}{q}$.

According to [15] we can estimate the autocorrelation function of a pixel by sweeping the CDS time between reset and signal-sample. We estimate the model parameters $I_{d|p_{m,n}}$ and $c_{k|p_{m,n}}$ from CDS samples of two image sensors A and B using:

$$X = A_V^{-1} \cdot [Z(t_0) - Z(t_0 + t)] \quad (24)$$
$$= Q_S + P(t_0, t_0 + t) + N(t_0) - N(t_0 + t)$$

$$\sigma^2_{X|p_{m,n}}(t) = 2 \cdot R_{N|p_{m,n}}(0) - 2 \cdot R_{N|p_{m,n}}(t) + \frac{I_{d|p_{m,n}}}{q} \cdot t$$

$$= 2 \cdot \sum_{k=1}^{K} c_{k|p_{m,n}} \cdot \left[1 - e^{-t/\tau_{k|p_{m,n}}}\right] + I_{d|p_{m,n}} \cdot \frac{t}{q}$$

$$\begin{pmatrix} c_{k|p_{m,n}} \\ \tau_{k|p_{m,n}} \\ I_{d|p_{m,n}} \end{pmatrix} = \arg\min_{\tilde{c}, \tilde{\tau}, \tilde{I}_d} \sum_{l=1}^{L} \left| S^2_{X|p_{m,n}}(t_l) - \sigma^2_{X|p_{m,n}}(t_l) \right|^2 \quad (25)$$

with the sample variance $S_{X|p_{m,n}}^2(t_l)$ expressed by eq. (26), where $$\bar{X}|_{p_{m,n}}(t) = \frac{1}{G} \sum_{i=1}^{G} X_i(t).$$

$$S^2_{X|p_{m,n}}(t) = \frac{1}{G-1} \sum_{i=1}^{G} \left[X_i(t) - \bar{X}|_{p_{m,n}}(t)\right]^2 \quad (26)$$

In embodiments, the values of the K time constants $\tau_{k|p_{m,n}}$ are predetermined as $[\tilde{\tau}_1, \tilde{\tau}_2, \ldots, \tilde{\tau}_K]$. In such embodiments, $\tilde{\tau}_k$ replaces $\tau_{k|p_{m,n}}$ in eqs (24) and (25) simplifies to eq. (27).

$$\begin{pmatrix} c_{k|p_{m,n}} \\ I_{d|p_{m,n}} \end{pmatrix} = \arg\min_{\tilde{c}, \tilde{I}_d} \sum_{l=1}^{L} \left| \begin{array}{c} S^2_{X|p_{m,n}}(t_l) - \\ \left(2 \cdot \sum_{k=1}^{K} \tilde{c}_{k|p_{m,n}} \cdot [1 + e^{-t_l/\tilde{\tau}_k}] + \tilde{I}_{d|p_{m,n}} \cdot \frac{t_l}{q}\right) \end{array} \right|^2 \quad (27)$$

Averages of model parameters $I_{d|p_{m,n}}$ and $c_{k|p_{m,n}}$ over an $\mathcal{M} \times \mathcal{N}$ pixel array may be expressed as eqs. (28a), (28b), and (28c).

$$\bar{I}_d = \frac{1}{\mathcal{M} \cdot \mathcal{N}} \sum_{m=1}^{\mathcal{M}} \sum_{n=1}^{\mathcal{N}} I_{d|p_{m,n}} \quad (28a)$$

$$\bar{I}_d^2 = \frac{1}{\mathcal{M} \cdot \mathcal{N}} \sum_{m=1}^{\mathcal{M}} \sum_{n=1}^{\mathcal{N}} I^2_{d|p_{m,n}} \quad (28b)$$

$$\bar{c}_k = \frac{1}{\mathcal{M} \cdot \mathcal{N}} \sum_{m=1}^{\mathcal{M}} \sum_{n=1}^{\mathcal{N}} c_{k|p_{m,n}} \quad (28c)$$

The algorithm Alg. 1, below, illustrates how we implement the actual fitting procedure. We capture sample variances $S_{X|p_{m,n}}^2(t_l), l \in \{1, \ldots, L\}$ for varying CDS time $t_l$. For Sensor A we used $t_l$ from 10 μs-140 μs and for Sensor B 3 μs-120 μs. The initialization of Alg. 1 shows that we assume that the Lorentzian time-constants $\tau_{k|p_{m,n}} = [\tau_0, \tau_7]^T$ can only exhibit a predefined set of values. This allows simplified regression. In practice not all $\tau_i$ may be present or active depending on e.g., the number of defects found in the oxide of a particular readout source-follower amplifier. Hence, for a predefined maximum amount of Lorentzians per pixel (here 7) we permutate through all $2^7 - 1 = 127$ boolean combinations of $b \in \{0,1\}^7$ and compute the fitting parameters for a given set of active time-constants using least-squares method as illustrated in lines 2 and 3 of Alg. 1. We then discard negative weights as these are not physically meaningful (see line 4). Not detailed in Alg. 1 is that, in embodiments, we start from the smallest time-constant, here 1 μs. We compute temporary fits $c_{tmp}$, $I_{d-tmp}$, corresponding residuals $\chi_{tmp}^2$ as well as a model size score $m_{c-max}$. We then permutate through all given combinations b starting from small time-constants toward larger ones and update the model if the residuals are reduced and or the model size increases. The last condition avoids overfitting. Note, that we discard a permutation if the linear-quadratic fit was ill-posed which we measure by the condition of $A^T A$.

---

Algorithm 1: Model estimation for an individual pixel

Initialization:
$[\tau_0, \ldots, \tau_7] = [1 \text{ ms}, 310 \text{ μs}, 100 \text{ μs}, 31 \text{ μs}, 10 \text{ μs}, 3.1 \text{ μs}, 1 \text{ μs}]$
$\chi_{min} = 10^{12}$
$m_{c-max} = 0$
1:  for all $b \in \{0,1\}^7$ do
2:  $A = \begin{pmatrix} 2b_0[1 - e^{\frac{-t_0}{\tau_0}}] & \ldots & 2b_7[1 - e^{\frac{-t_0}{\tau_7}}] & \frac{t_0}{q} \\ \vdots & \ddots & \vdots & \ddots \\ 2b_0[1 - e^{\frac{-t_L}{\tau_0}}] & \ldots & 2b_7[1 - e^{\frac{-t_L}{\tau_7}}] & \frac{t_L}{q} \end{pmatrix}$
3:  $[c_{tmp}, I_{d-tmp}]^T = [A^T A]^{-1} A^T S_{X|p_{m,n}}^2$
4:  $c_i \leftarrow \max(c_i, 0) \; \forall i \in \{1, \ldots, 7\}$
5:  $\chi_{tmp}^2 = \text{mean} \; |S_{X|p_{m,n}}^2 - A[c_{tmp}, I_{d-tmp}]^T|$
6:
7:  if $\text{cond}(A^T A) \leq 10^{14}$ & $\chi_{tmp}^2 \leq \chi_{min}^2$ & $\Sigma_k c_k \geq m_c$
8:  then
9:    $[c, I_d]^T \leftarrow [c_{tmp}, I_{d-tmp}]^T$
10:    $X_{min}^2 \leftarrow X_{tmp}^2$
11:    $m_{c-max} \Sigma_k c_k$
12:  endif
13: endfor
14: $[c_{k|p_{m,n}}, I_{d|p_{m,n}}]^T \leftarrow [c, I_d]^T$

---

Figure 3:
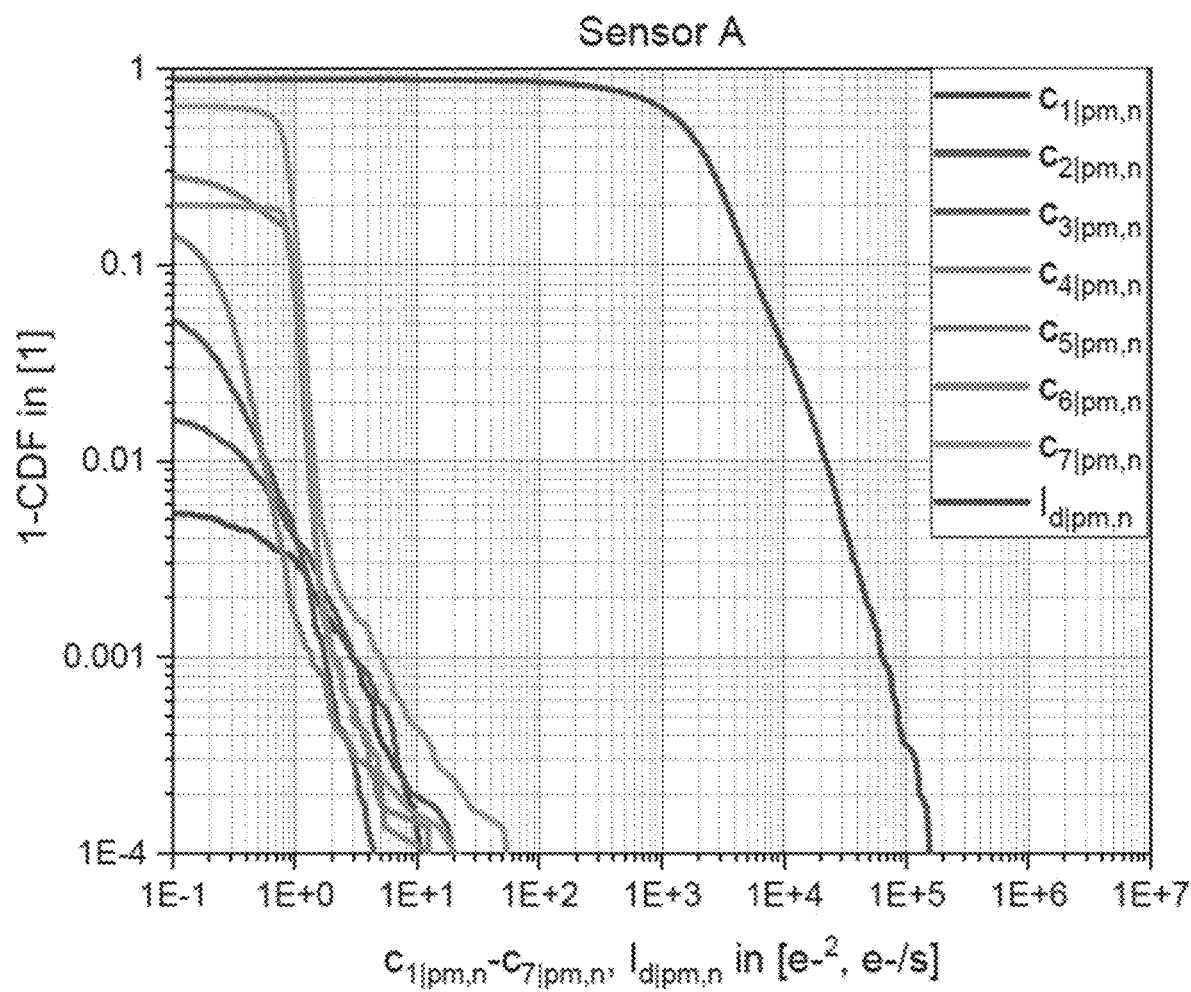
FIGS. 3 and 4 show example distributions of fitting parameters after pixel level regression for two example image sensors that include the pixel of FIG. 1.
Figure 4:
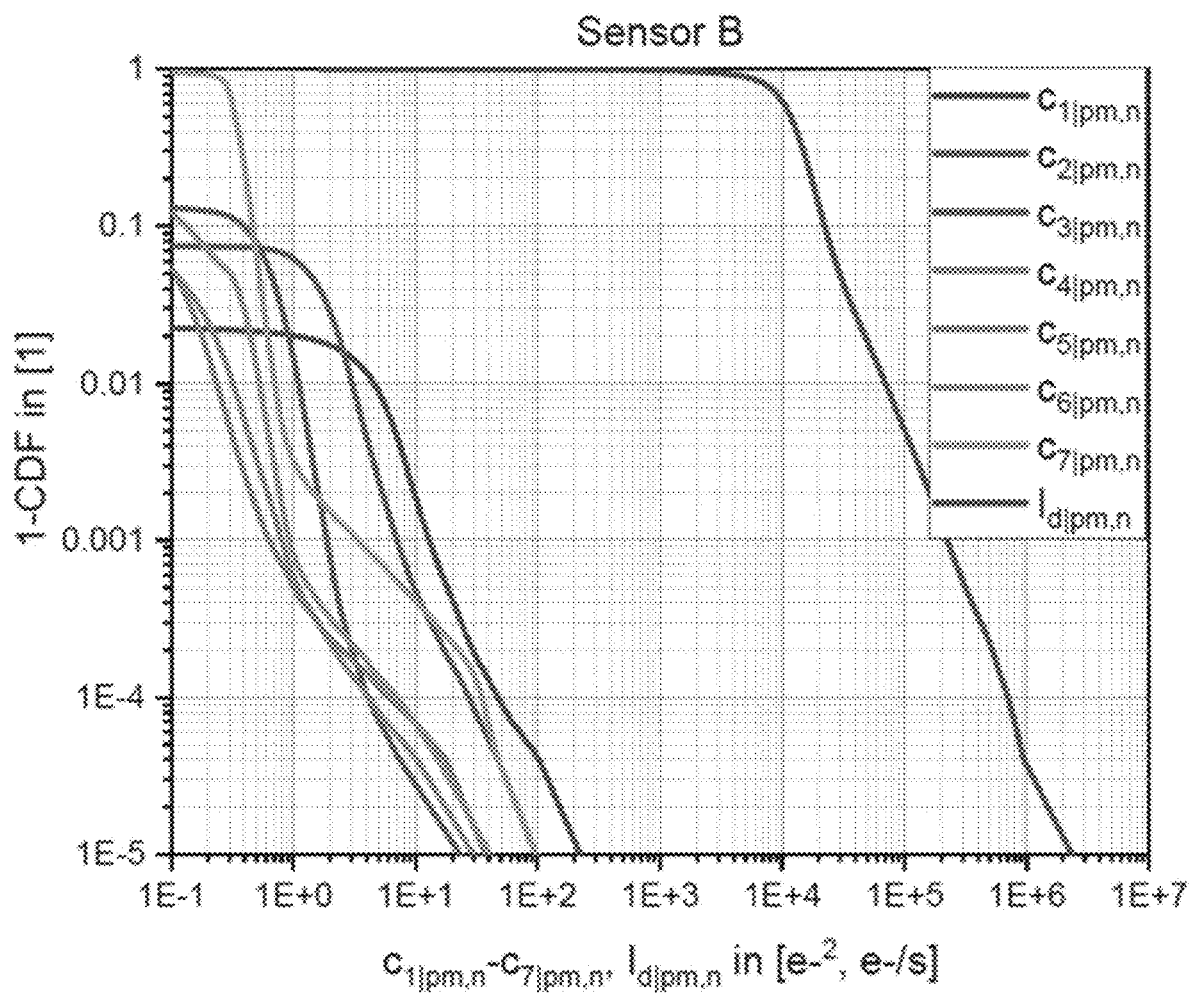

FIG. 3 and FIG. 4 show example distributions of fitting parameters $c_{k|p_{m,n}}$ and $I_{d|p_{m,n}}$ after pixel level regression for sensor A and sensor B, respectively. The reason that the 1–CDF curves do not reach 1 in logscale is that some pixels do not exhibit these time-constants. Hence, the difference to 1 gives rise to the significance of $\tau_{k|p_{m,n}}$, $c_{k|p_{m,n}}$.

5. Results

Through the law of total covariance and eq. (6), the elements of the total covariance can be derived to:

$$\text{cov}_X(i, j) = \quad (29)$$
$$R_X(i, j) - E^2[I_d] \cdot \left(\frac{\Delta t}{q}\right)^2 \cdot \begin{cases} [2i-1] \cdot [2j-1], & \text{for CMS, NOCMS} \\ 1, & \text{for SMS, NOSMS} \end{cases}$$

with $R_X$ being the total autocorrelation function. We determine $R_X$ from eq. (23) directly by taking the expectation. Given our assumption made in Sec. 4 that the time-constants of the Lorentzians are not considered random numbers, which means that the randomness is captured in $c_k$ rather than $\tau_k$ one yields eq. (30), where $\bar{I}_d$, $\bar{I}_d^2$, and $\bar{c}_k$ are given by eq. (28).

$$R_X(i, j) = \frac{\bar{I}_d^2}{q^2} \cdot [2i-1][2j-1] \cdot (\Delta t)^2 \quad (30)$$

-continued $$+\frac{\bar{I}_d}{q} \cdot \Delta t \cdot (2 \cdot \min[i, j] - 1)$$

$$+\sum_{k=1}^{K} \bar{c}_k \cdot [2 \cdot e^{-\Delta t \cdot |j-i|/\tau_k} - 2 \cdot e^{-\Delta t \cdot |j+i-1|/\tau_k}]$$

for CMS, NOCMS $$= \frac{\bar{I}_d^2}{q^2} \cdot (\Delta t)^2 + \delta(i,j) \cdot (\bar{I}_d/q) \cdot \Delta t$$

$$+\sum_{k=1}^{K} \bar{c}_k \cdot [2 \cdot e^{-2\Delta t \cdot |j-i|/\tau_k} - e^{-\Delta t \cdot |2(i-j)+1|/\tau_k}$$

$$-e^{-\Delta t \cdot |2(j-i)+1|/\tau_k}]$$

for SMS, NOSMS.

Hence, we can determine the total expectation directly by calculating the averages of $c_{k|p_{m,n}}$ and by the first and second sample moment of $I_{d|p_{m,n}}$, which were determined using Alg. 1.

Figure 5:
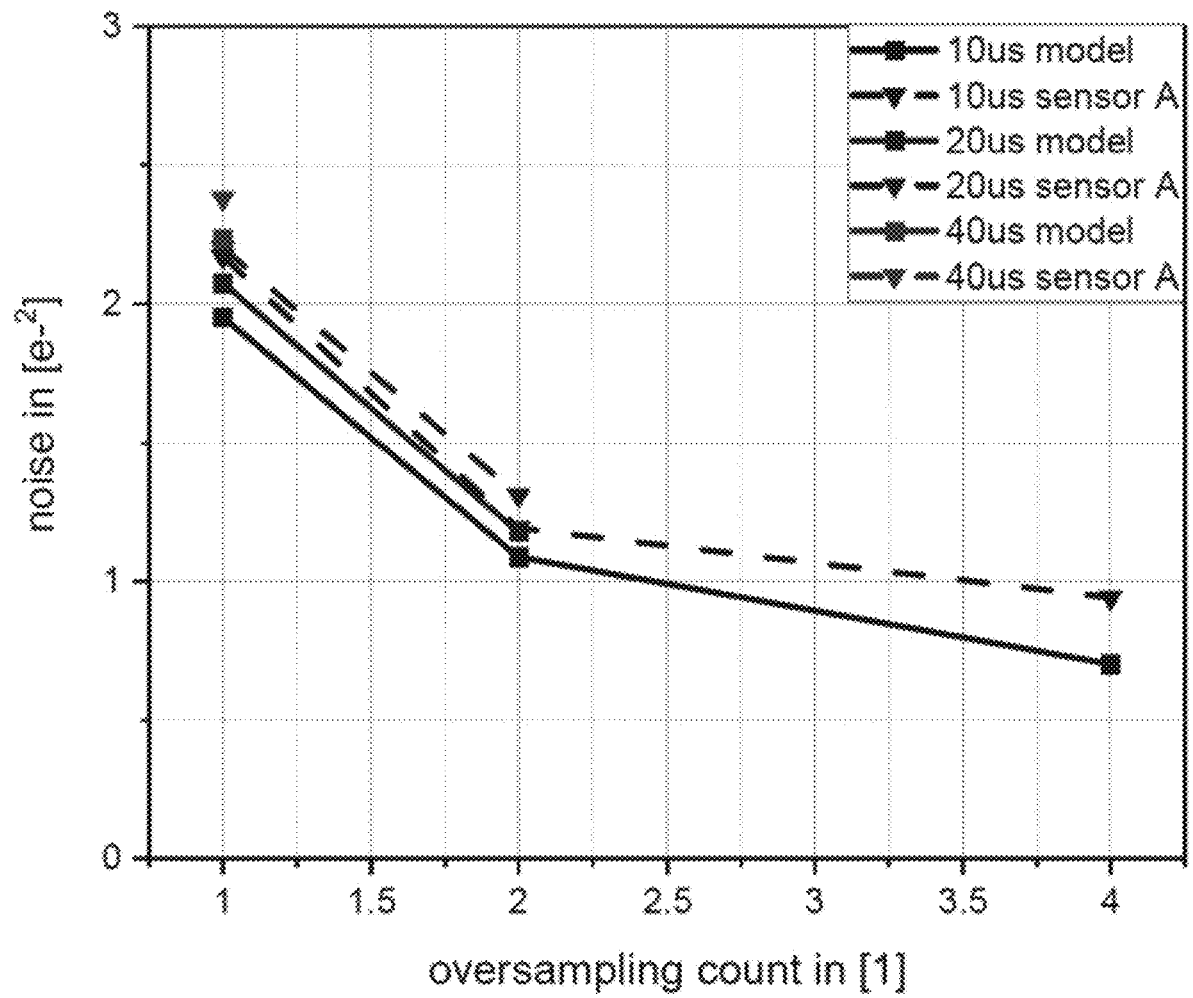
FIG. 5 is a graphical validation of the noise model used to generate FIG. 3, based on correlated multiple sampling (CMS), in an embodiment.

FIG. 5 illustrates a verification of the model based on CMS. CDS samples of sensor A were used to derive model parameters according to Alg. 1. The model parameters were used to calculate the total covariance through eqs. (29) and (30), and then the total variance is computed from eq. (31) and compared with CMS measurements of the same sensor A. For as long as N·Δt lies in the noise parameter fitting range a good resemblance between model and measurements results.

Sensor A implements CMS and hence, is used to verify the model presented herein. Here, we varied Δt of 10 μs, 20 μs, 40 μs, & 80 μs. For each Δt setting we acquire read noise data for ×1, ×2 and ×4 oversampling. FIG. 5 demonstrates a reasonable resemblance of model and measurements as long as the total read-time N·Δt does not exceed the range of $t_f$ used to fit the model as described in Sec. 4. We determined $\sigma_Y^2$ from the model parameters derived through Alg. 1, which are used to compute the total autocorrelation function $R_X$ by eq. (30), which is then used to compute the total covariance using eq. (29), and finally enables computation of:

$$\sigma_Y^2 = \alpha^T \cdot cov_X \cdot \alpha. \qquad (31)$$

Figure 6:
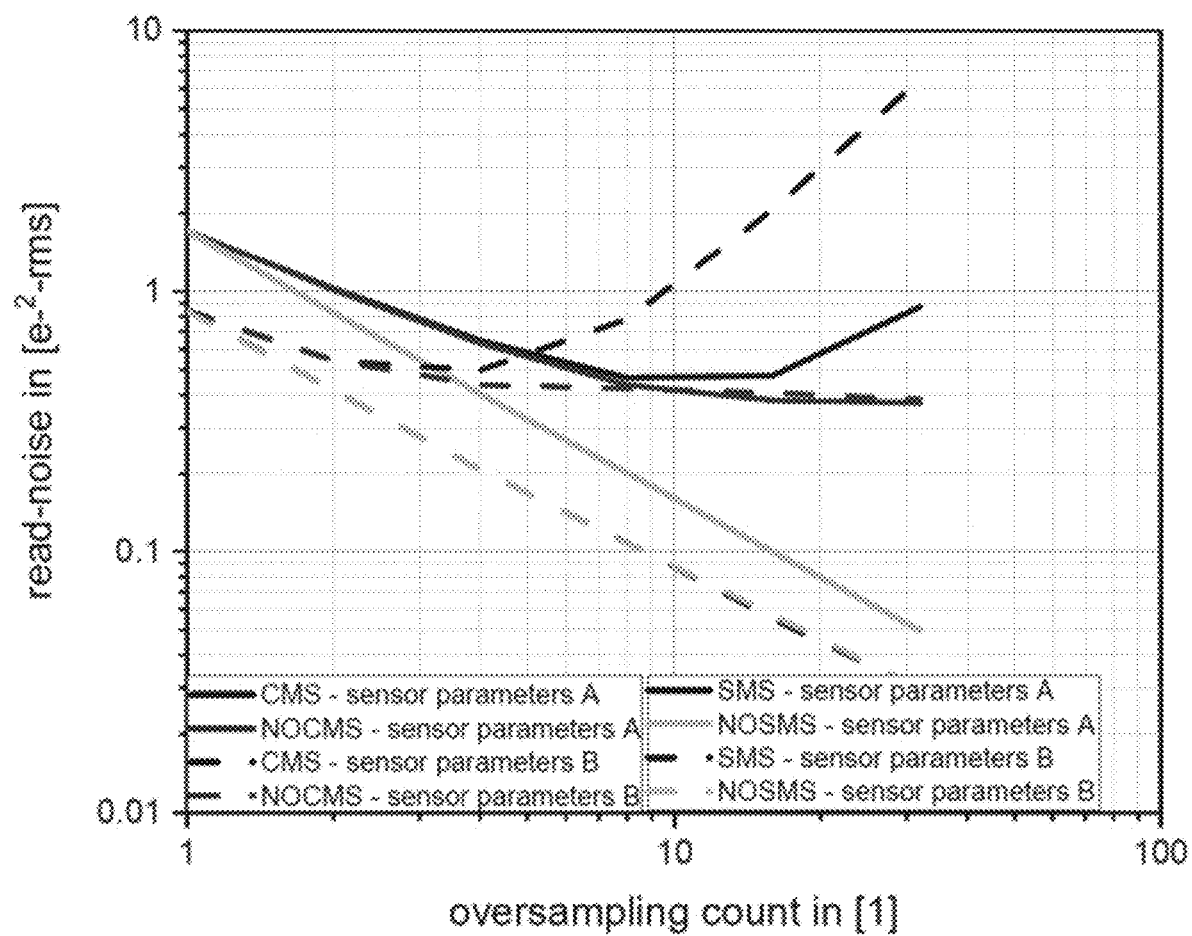
FIG. 6 is a graph illustrating example predicted read noise as a function of oversampling count for different sampling schemes of the image sensor of FIG. 1.

Having verified the validity of the presented model we now compare CMS, NOCMS, SMS and NOSMS in FIG. 6. FIG. 6 illustrates oversampling results based on model from sensor A and B. One can observe increased noise at larger oversampling counts for CMS due to FD leakage current. NOCMS yields 20% noise reduction for sensor A and 23% for sensor B compared to CMS by applying optimal weights. One can see that NOCMS maintains low noise performance at increasing oversampling count. SMS and NOSMS allow significant noise reduction compared to CMS and NOCMS due to limited correlation times between signal and reset-sample. Both methods yield similar performance here, as we did not consider the leakage current of the buried memory node of the floating gate amplifier.

We calculate α* based on the expected covariance through eq. (19) and then compute $\sigma_Y^2$ from eq. (31). Here, we chose Δt of 4 μs and assumed that the conversion gain of CMS and SMS can be matched. Depending on the sensor specifics, FD leakage can become the dominant noise source in CMS leading to a significant increase in read noise for, e.g., sensor B. It can be seen that NOCMS is greatly helpful in reducing the impact of FD dark current or flicker noise such that instead of yielding a potentially narrow localized noise minimum, read noise can be further reduced until eventually a plateau is reached. The actual read noise minimum was reduced by 20% for sensor A and 23% for sensor B using noise optimization. It can be seen that due to the high correlation of the signal and reset-samples noise-optimization is less helpful for skipper mode-readout. Note that if one could design a skipper mode readout structure with sufficiently high conversion gain while keeping the buried memory storage and sense node leakage currents sufficiently small, SMS may have a competitive advantage in reaching ultra-low read noise over CMS or NOCMS.

Figure 7:
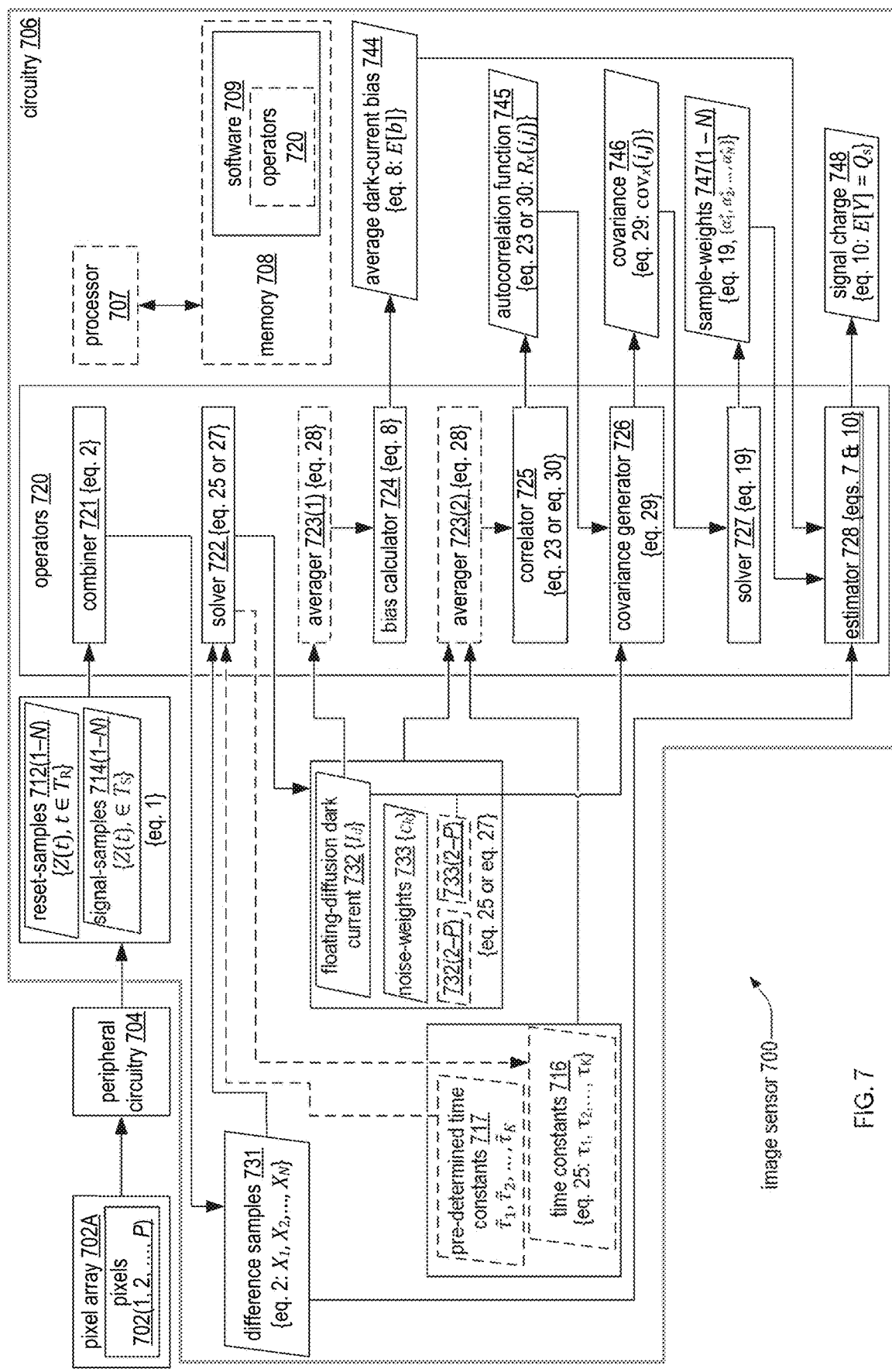
FIG. 7 is a schematic of an embodiment of an image sensor.

FIG. 7 is a schematic of an image sensor 700. Image sensor 700 includes a pixel array 702A and peripheral circuitry 704, which includes an analog-to-digital converter. Pixel array 702A includes a plurality of pixels 702(1, 2, . . . , P), where P may be the total number of pixels ($\mathcal{M} \times \mathcal{N}$) of pixel array 702A. Peripheral circuitry 704 is communicatively coupled to pixel array 702A.

Image sensor 700 includes circuitry 706, which is communicatively coupled to pixel array 702A. Circuitry 706 may be part of peripheral circuitry 704. In embodiments, circuitry 706 is, or includes an integrated circuit, such as an application-specific integrated circuit or a field-programmable gate array. Circuitry 706 executes several functions of image sensor 700 described herein, which are represented by operators 720. Each of operators 720 may be executed by one or more circuits of circuitry 706. Operators 720 include a combiner 721, a solver 722, a bias calculator 724, a correlator 725, a covariance generator 726, a solver 727, and an estimator 728. Operators 720 may also include at least one of averagers 723(1) and 723(2). In FIG. 7, the box representing each operator includes a reference to one of the numbered equations above, which means that in embodiments, the operator uses this equation, by executing it for example.

In embodiments, circuitry 706 includes at least one of a processor 707 and a memory 708, which stores software 709. Software 709 may include operators 720, in which case each operator 720 includes machine readable instructions that are executed by processor 707 to implement functionality of image sensor 700.

Memory 708 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 708 may be integrated into processor 707.

In an example mode of operation, a pixel 702 generates signals in response to light incident thereon. In response to the signals received from pixel 702, peripheral circuitry 704 outputs a plurality of reset-samples 712 and signal-samples 714, hereinafter also reset-samples 712(1, 2, . . . , N) and signal-samples 714(1, 2, . . . , N). When executing a method 800 described below, operators 720 receive samples 712 and 714 and generate a signal charge 748.

To generate signal charge 748 from samples 712 and 714, each operator 720 other than estimator 728, generates a respective intermediate output that is used by a subsequent operator 720. These intermediate outputs include difference samples 731, either time constants 716 and pre-determined time constants 717, a floating-diffusion dark current 732, noise-weights 733, an average dark-current bias 744, an auto correlation function 745, covariances 746 of difference samples 731, and sample weights 747(1, 2, . . . , N). At one or more instances during the execution of method 800, at least one of each of these intermediate outputs is stored in a memory of circuitry 706, such a memory 708. In FIG. 7, the box representing each intermediate output includes a reference to one of the numbered equations above and a symbol of that equation. In embodiments, the intermediate output is associated with this equation, for example, by being the quantity represented by the symbol. The same applies to signal charge 748.

Figure 8:
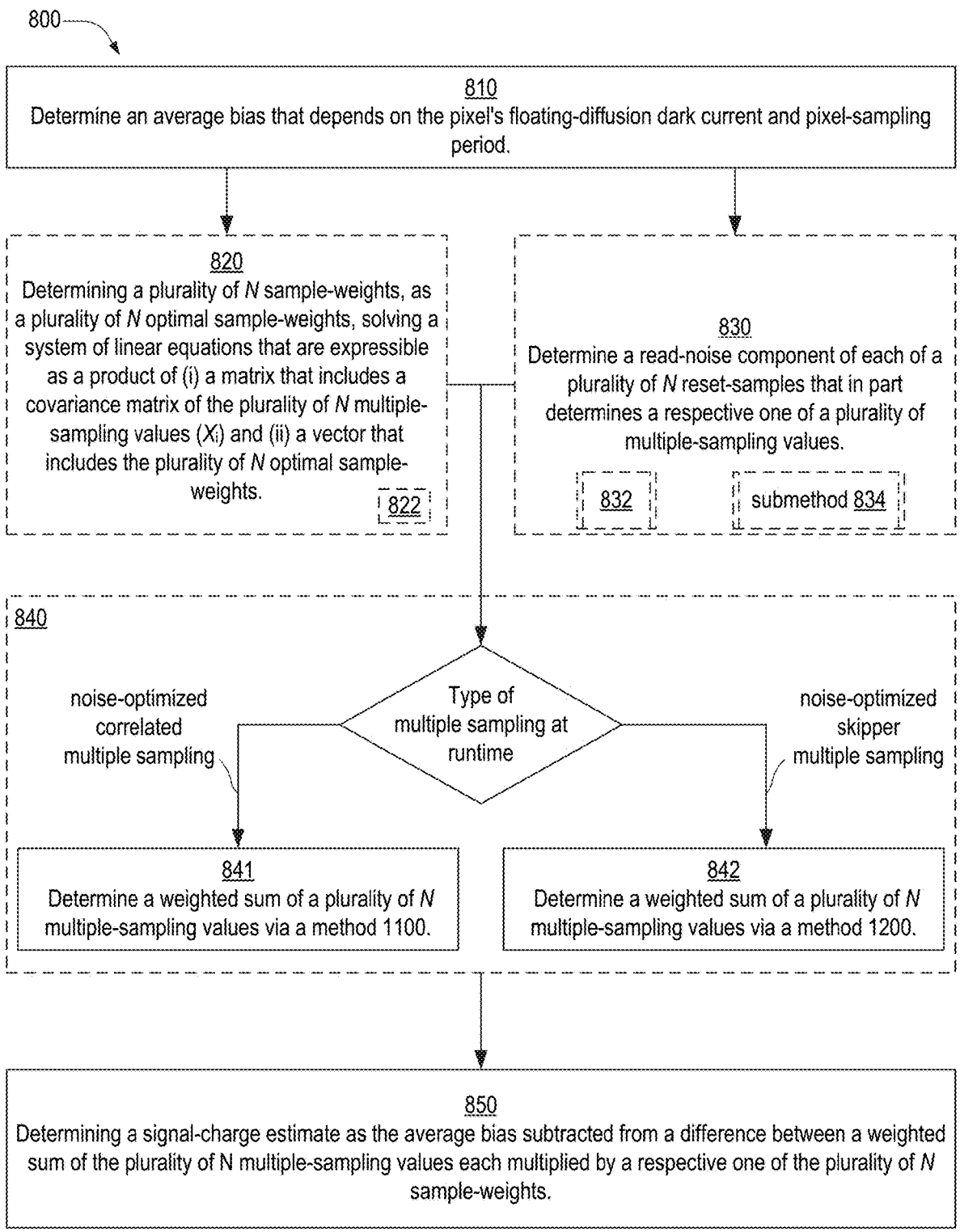
FIG. 8 is a flowchart illustrating a method for estimating a signal charge collected by a pixel of the image sensor of FIG. 7, in embodiments.

FIG. 8 is a flowchart illustrating a method 800 for estimating a signal charge collected by a pixel of an image sensor. Method 800 includes steps 810 and 850. In embodiments, method 800 is implemented within one or more aspects of image sensor 700. In embodiments, method 800 is implemented by processor 707 executing computer-readable instructions of software 709.

Step 810 includes determining an average bias that depends on the pixel's floating-diffusion dark current and pixel-sampling period. In an example of step 810, bias calculator 724 determines average dark-current bias 744 of pixel 702(1) from floating-diffusion dark current 732 and noise-weights 733 by executing equation (8).

Step 850 includes determining a signal-charge estimate as the average bias subtracted from a difference between a weighted sum of a plurality of N multiple-sampling values each multiplied by a respective one of a plurality of N sample-weights. In embodiments, the plurality of N optimal sample-weights at least one of (i) collectively minimize an expected value of the signal-charge estimate squared and (ii) sum to unity. In an example of step 850, estimator 728 determines signal charge 748 from sample weights 747 and difference samples 731 by executing equation (10).

In embodiments, method 800 also includes at least one of steps 820, 830, and 840. Step 820 includes determining the plurality of N sample-weights, as a plurality of N optimal sample-weights, by solving a system of linear equations that are expressible as a product of (i) a matrix that includes a covariance matrix of the plurality of N multiple-sampling values ($X_i$) and (ii) a vector that includes the plurality of N optimal sample-weights. The matrix may be a Hessian matrix. The plurality of N optimal sample-weights (i) collectively minimize an expected value of the signal-charge estimate squared and (ii) sum to unity. In an example of step 820, solver 727 determines the set of weights $\{\alpha_1^*, \alpha_2^*, \ldots, \alpha_N^*\}$ by solving the system of linear equations of eq. (19), which includes covariances 746.

Step 820 may include step 822, which includes inverting the matrix. In an example of step 822, solver 727 determines the set of weights $\{\alpha_1^*, \alpha_2^*, \ldots, \alpha_N^*\}$ by inverting matrix $H_L$ (eq. (19)), which includes covariances 746.

Step 830 is applicable when two conditions apply. First, each of the plurality of multiple-sampling values is expressible by equation (2), and is hence proportional to a difference between (i) a respective one of a plurality of N reset-samples (e.g., $Z(t_{R-i})$) output by the pixel and (ii) a respective one of a plurality of N signal-samples (e.g., $Z(t_{S-i})$) output by the pixel. The plurality of difference-samples 731 is an example of such a plurality of multiple-sampling values. Second, each of the plurality of N reset-samples including a read-noise component, e.g., $N(t_{R-i})$ of equation (2). Step 830 includes determining the read-noise component as a weighted sum of Lorentzian noise sources each having a respective time-constant. In example of step 830, correlator 725 determines read-noise component $R_{N|P_{m,n}}(t_1, t_2)$ of equation (21).

Step 840 includes either step 841 or step 842 depending on the type of multiple sampling the image sensor implements. Each of steps 841 and 842 includes determining a weighted sum of the plurality of N multiple-sampling values introduced in step 850. When the image sensor implements noise-optimized correlated multiple sampling, step 840 includes step 841, which implements a method 1100 described below. When the image sensor implements noise-optimized skipper multiple sampling, step 840 includes step 842, which implements a method 1200 described below.

Figure 9:
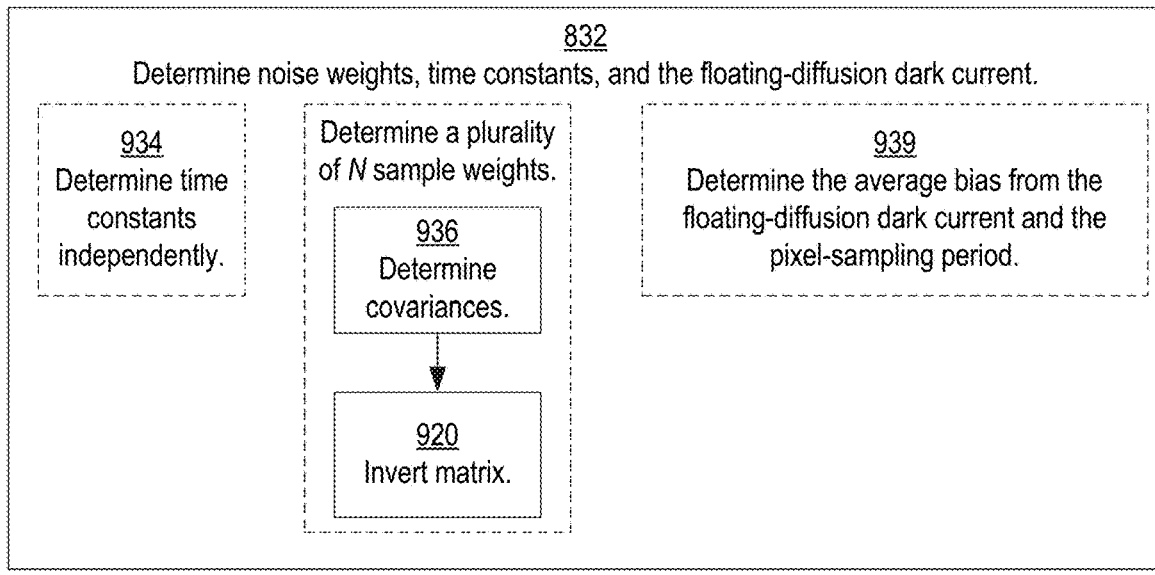
FIG. 9 is a flowchart illustrating a step of the method of FIG. 8, in embodiments.
Figure 10:
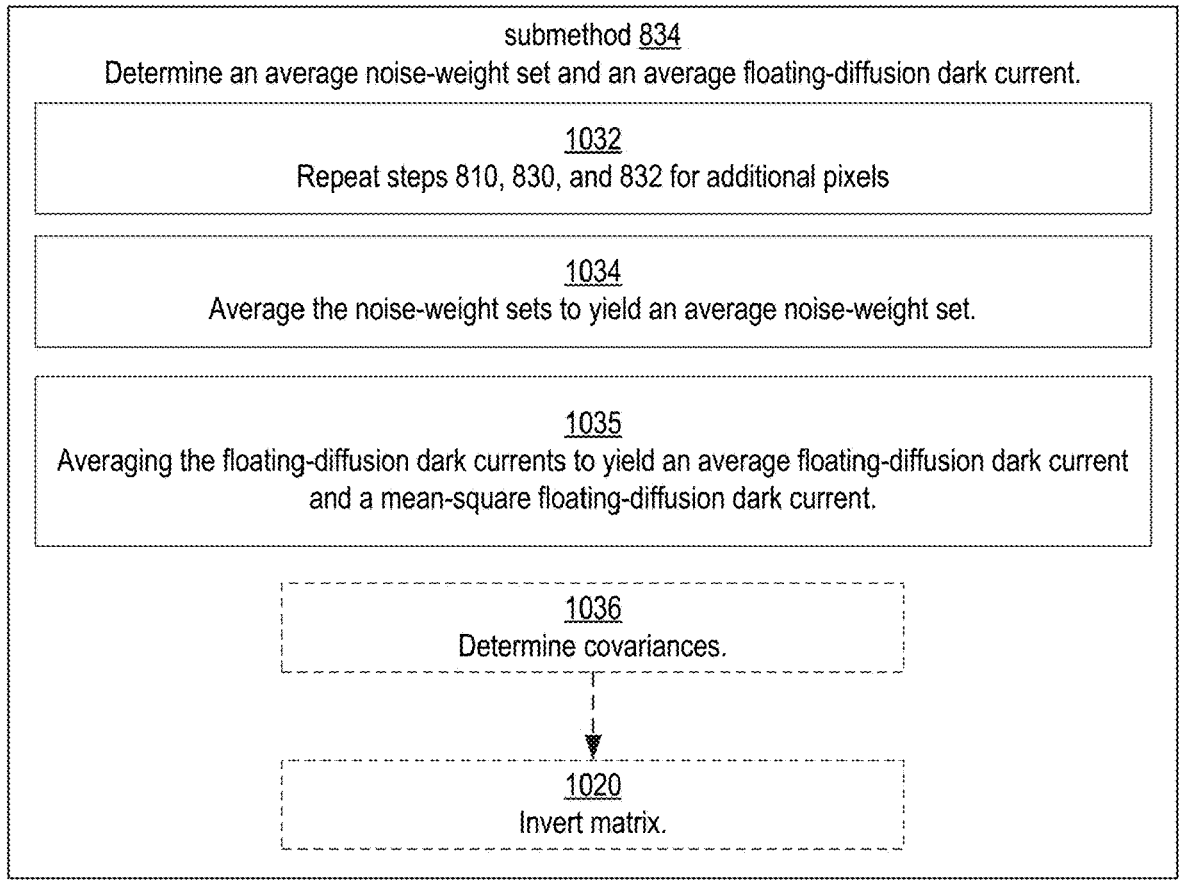
FIG. 10 is a flowchart illustrating a submethod of the method of FIG. 8, in embodiments.

In embodiments, step 830 includes at least one of step 832 and submethod 834, illustrated in FIGS. 9 and 10 respectively. Step 832 is applicable when each term of the weighed sum includes a respective noise-weight of a noise-weight set. Step 832 includes determining values of (i) each of the respective noise-weights (e.g., $c_k$), (ii) each of the respective time-constants (e.g., $\tau_k$), and (iii) the floating-diffusion dark current (e.g., $I_d$) that minimize a sum of a plurality of differences between (a) the sample variance (e.g., $S_X^2$) of the plurality of N multiple-sampling values ($X_{i=1-N}$) and (b) a model-based sample-variance (e.g., $\sigma_X^2$) that depends on the read-noise component (e.g., $R_N$), each of the plurality of differences corresponding to a respective time delay between samples (e.g., ($t_0+t_i$)). In an example of step 832, solver 722 applies equation (25) to determine noise-weights 733, floating-diffusion dark current 732, and time constants 716 from difference samples 731.

Step 832 may include step 934, in which each of the respective time-constants are determined both (i) before determining each of the respective noise-weights and the floating-diffusion dark current, and (ii) independently of the sum of the plurality of differences. In an example of step 934, solver 722 applies equation (27) to determine noise-weights 733 and floating-diffusion dark current 732 from difference samples 731 and pre-determined time constants 717.

Step 832 may include steps 936 and 920, which together result in determining the plurality of N sample-weights, as a plurality of N optimal sample-weights. Step 920 is similar to step 820. Accordingly, in embodiments method 800 includes one and only one of steps 820 and 920.

Step 936 includes determining, for each pair of multiple-sampling values of the plurality of N multiple-sampling values, a respective covariance of the pair of multiple-sampling values that depends on the noise-weight set and the floating-diffusion dark current. In an example of step 936, correlator 725 applies either equation (23) or (30) to determine autocorrelation function 745 from floating-diffusion dark current 732, noise-weights 733, and either time constants 716 or pre-determined time constants 717. In this example of step 936, covariance generator 726 applies equation (29) to determine covariances 746 from autocorrelation function 745 and floating-diffusion dark current 732.

Step 920 includes inverting a matrix that includes a matrix of the covariances, wherein the plurality of N optimal sample-weights $\{\alpha_1^*, \alpha_2^*, \ldots, \alpha_N^*\}$ (i) collectively minimize an expected value of the signal-charge estimate squared ($\tilde{Y}^2$) and (ii) sum to unity. In an example of step 920, solver 727 determines the set of weights $\{\alpha_1^*, \alpha_2^*, \ldots, \alpha_N^*\}$ by inverting matrix $H_L$ (eq. (19)), which includes covariances 746.

In embodiments, step 832 includes step 939. Step 939 includes determining the average bias from the floating-diffusion dark current and the pixel-sampling period. In a first example of step 939, bias calculator 724 implements equation (8) to determine average dark-current bias 744 from floating-diffusion dark current 732. In a first example of step 939, bias calculator 724 implements equation (8) to determine average dark-current bias 744 from an average of floating-diffusion dark current 732 (per equation (28a))

output from averager 723(1). In both examples, average dark-current bias 744 is E[b] of equation (7).

Submethod 834 includes determining an average noise-weight set and an average floating-diffusion dark current. Submethod 834 includes steps 1032, 1034, and 1035. Step 1032 includes, for each of a plurality of additional pixels of the image sensor, repeating steps 810, 830, and 832 to yield a plurality of additional noise-weight sets and a plurality of additional floating-diffusion dark currents. In an example of step 1032, for each of pixels 702(2-P), circuitry 706 executes combiner 721 and solver 722 to determine a respective additional floating-diffusion dark current 732(2-P) and a respective additional set of noise-weights 733(2-P).

Step 1034 includes averaging each of the noise-weight set and the plurality of additional noise-weight sets to yield an average noise-weight set. In an example of step 1034, one of averagers 723 averages noise-weights 733 and additional sets of noise-weights 733(2-P) to yield an average noise-weight set.

Step 1035 includes averaging the floating-diffusion dark current and the plurality of additional floating-diffusion dark currents to yield an average floating-diffusion dark current and a mean-square floating-diffusion dark current. In an example of step 1034, one of averagers 723 averages floating-diffusion dark current 732 and additional floating-diffusion dark currents 732(2-P) to yield an average floating-diffusion dark current.

Submethod 834 may include steps 1036 and 1020, which together result in determining the plurality of N sample-weights, as a plurality of N optimal sample-weights. Step 1020 is similar to steps 820 and 920. Accordingly, in embodiments method 800 includes one and only one of steps 820, 920, and 1020.

Step 1036 includes determining, for each pair of multiple-sampling values of the plurality of N multiple-sampling values, a covariance of the pair of multiple-sampling values that depends on the average noise-weight set, the average floating-diffusion dark current. and the mean-square floating-diffusion dark current. In an example of step 1036, correlator 725 applies equation (30) to determine autocorrelation function 745 from the average of floating-diffusion dark currents 732, the average of noise-weights 733, and pre-determined time constants 717. In this example of step 936, covariance generator 726 applies equation (29) to determine covariances 746 from autocorrelation function 745 and averages of floating-diffusion dark currents 732.

Step 1020 includes inverting a matrix that includes a matrix of the covariances, wherein the plurality of N optimal sample-weights $\{\alpha_1^*, \alpha_2^*, \ldots, \alpha_N^*\}$ (i) collectively minimize an expected value of the signal-charge estimate squared ($\tilde{Y}^2$) and (ii) sum to unity. In an example of step 1020, solver 727 determines the set of weights $\{\alpha_1^*, \alpha_2^*, \ldots, \alpha_N^*\}$ by inverting matrix $H_L$ (eq. (19)), which includes covariances 746.

Figure 11:
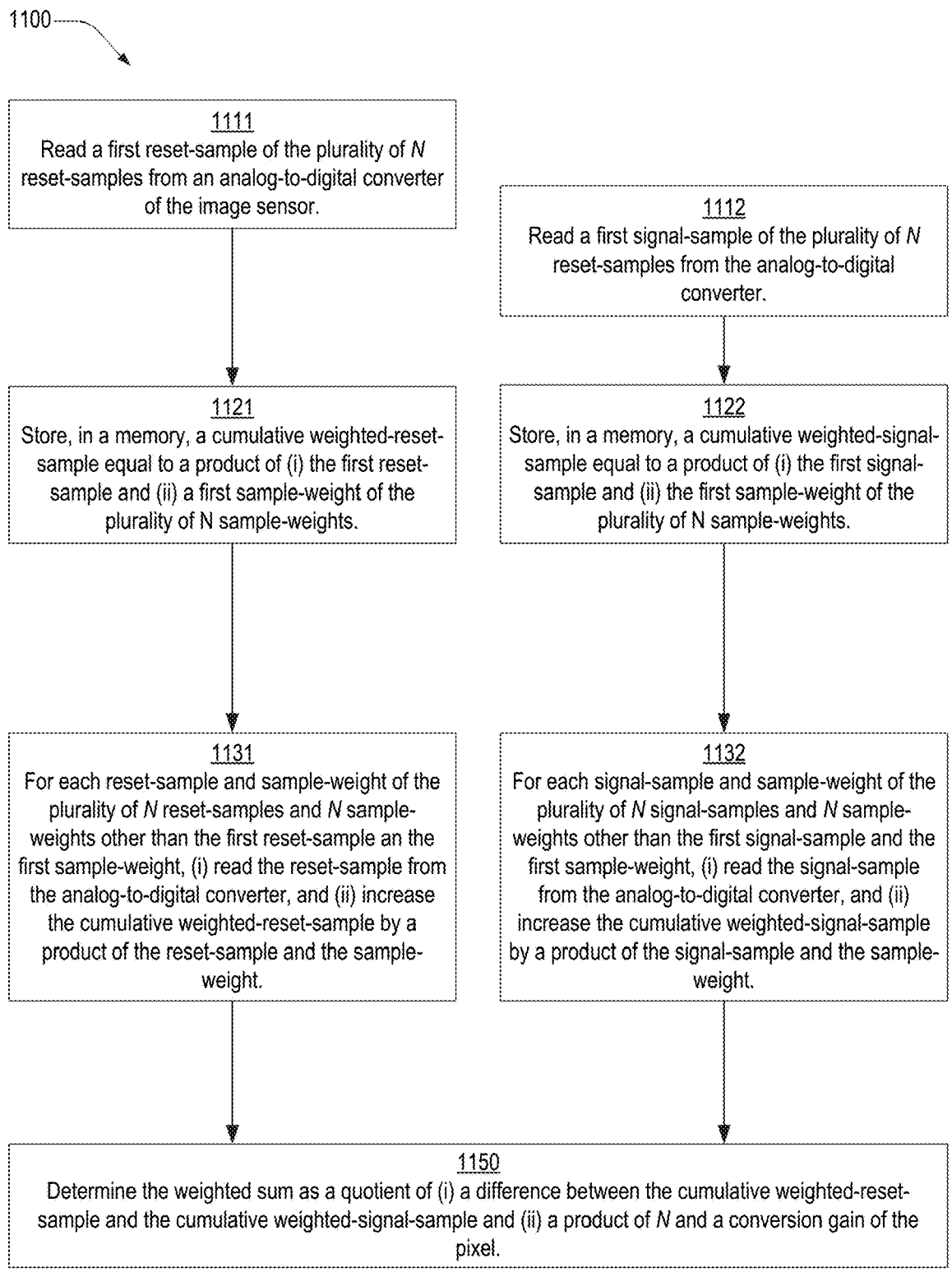
FIGS. 11 and 12 are respective a flowcharts illustrating method for determining a weighted sum of N multiple-sampling values of the method of FIG. 8, in embodiments.

FIG. 11 is a flowchart illustrating a method 1100 for determining the weighted sum of the plurality of N multiple-sampling values of step 840. when image sensor 700 uses a noise-optimized correlated multiple sampling scheme, this weighed sum may be used as the first term of equation (7), ($\Sigma_{i=1}^N \alpha_i X_i$). Method 1100 includes steps 1111, 1112, 1121, 1122, 1131, 1132, and 1150. In embodiments, method 1100 is implemented within one or more aspects of image sensor 700.

Step 1111 includes reading a first reset-sample of the plurality of N reset-samples from an analog-to-digital converter of the image sensor. In an example of step 1111, circuitry 706 reads reset-sample 712(1) from an analog-to-digital converter of peripheral circuitry 704.

Step 1121 includes storing, in a memory, a cumulative weighted-reset-sample equal to a product of (i) the first reset-sample and (ii) a first sample-weight of the plurality of N sample-weights. In an example of step 1121, image sensor 700 stores, in memory 708, a cumulative weighted-reset-sample $\mathcal{R}_1$ equal to a product of (i) reset-sample 712(1), e.g., $Z(t_{R-1})$, and (ii) a sample-weight 747(1), e.g., $\alpha_1^*$ of equation (19).

Step 1131 includes, for each reset-sample and sample-weight of the plurality of N reset-samples and N sample-weights other than the first reset-sample and first sample-weight, (a) reading the reset-sample from the analog-to-digital converter, and (b) increasing the cumulative weighted-reset-sample by a product of the reset-sample and the sample-weight. In an example of step 1131, for each reset-sample 712(i=2, 3, ..., N), circuitry 706 (a) reads reset-sample 712(i) from the analog-to-digital converter of peripheral circuitry 704, and (b) increases the cumulative weighted-reset-sample R by a product of reset-sample 712(i) and its corresponding sample-weight 747(i): $\mathcal{R}_{i\geq 1} = \mathcal{R}_{i-1} + \alpha_i^* Z(t_{R-i})$, $\mathcal{R}_0 = 0$. After iterating step 1131 (N−1) times, the resulting cumulative weighted-reset-sample is $\mathcal{R}_N$.

Step 1112 includes reading a first signal-sample of the plurality of N reset-samples from the analog-to-digital converter. In embodiments, step 1111 precedes step 1112. In an example of step 1111, circuitry 706 reads signal-sample 714(1) from the analog-to-digital converter of peripheral circuitry 704.

Step 1122 includes storing, in a memory, a cumulative weighted-signal-sample equal to a product of (i) the first signal-sample and (ii) the first sample-weight of the plurality of N sample-weights. In an example of step 1122, image sensor 700 stores, in memory 708, a cumulative weighted-signal-sample $\mathcal{S}_1$ equal to a product of (i) signal-sample 714(1), e.g., $Z(t_{S-1})$, and (ii) sample-weight 747(1), e.g., $\alpha_1^*$ of equation (19).

Step 1132 includes, for each signal-sample and sample-weight of the plurality of N signal-samples and N sample-weights other than the first signal-sample and first sample-weight, (i) reading the signal-sample from the analog-to-digital converter, and (ii) increasing the cumulative weighted-signal-sample by a product of the signal-sample and the sample-weight. In an example of step 1132, for each signal-sample 714(i=2, 3, ..., N), circuitry 706 (i) reads signal-sample 714(i) from the analog-to-digital converter of peripheral circuitry 704, and (ii) increases the cumulative weighted-signal-sample $\mathcal{S}$ by a product of signal-sample 714(i) and its corresponding sample-weight 716(i): $\mathcal{S}_{i\geq 1} = \mathcal{S}_{i-1} + \alpha_i^* Z(t_{S-i})$, $\mathcal{S}_0 = 0$. After iteratively executing step 1132 a total of (N−1) times, the resulting cumulative weighted-signal-sample is $\mathcal{S}_N$.

Step 1150 includes determining the weighted sum as a quotient of (i) a difference between the cumulative weighted-reset-sample and the cumulative weighted-signal-sample and (ii) a product of N and a conversion gain of the pixel. In an example of step 1150, estimator 728 determines ($\Sigma_{i=1}^N \alpha_i X_i$) of equation (7) as equal to ($\mathcal{R}_N - \mathcal{S}_N)/(N \cdot A_V)$, where $A_V$ is the pixel's conversion gain.

Figure 12:
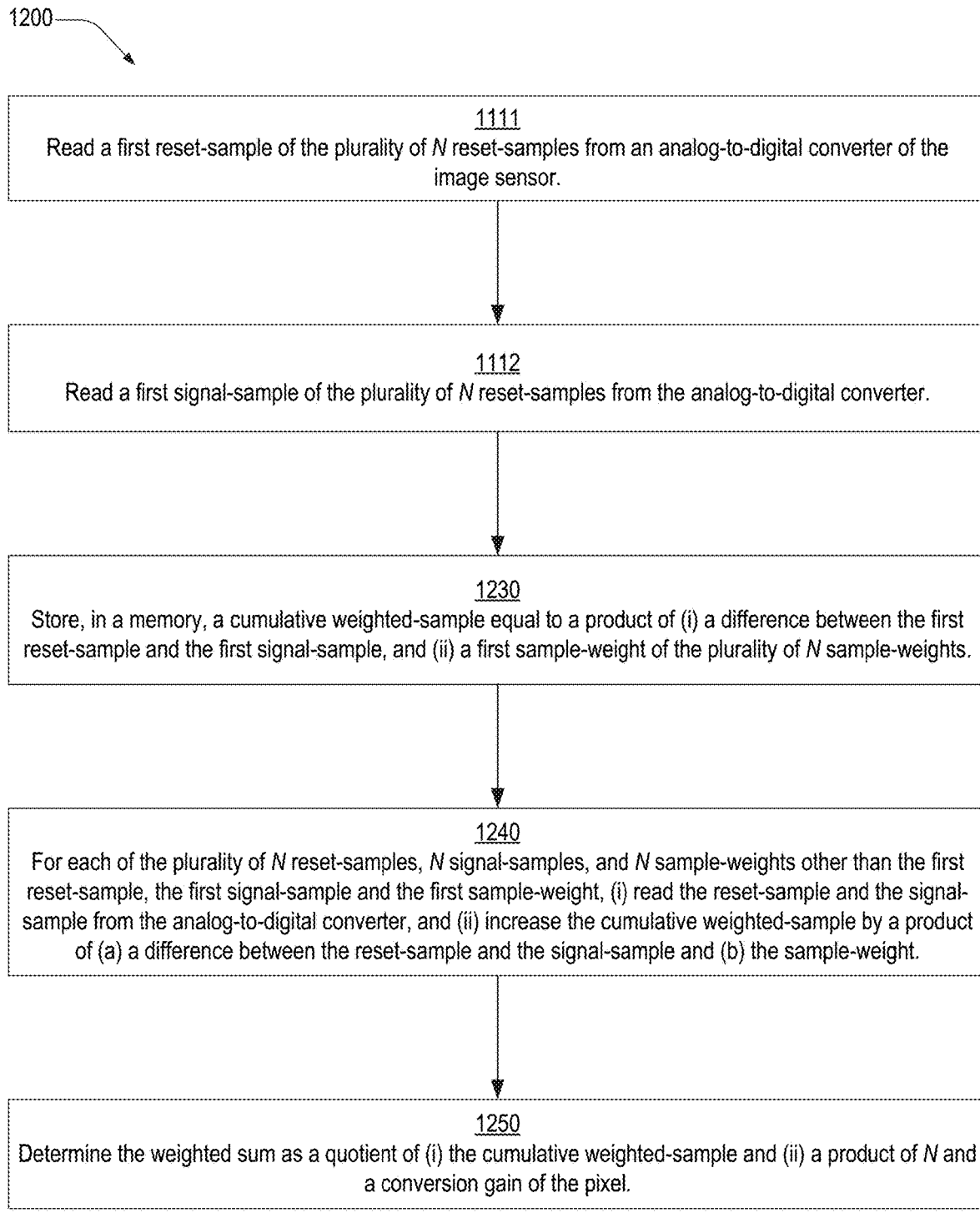

FIG. 12 is a flowchart illustrating a method 1200 for determining the weighted sum of the plurality of N multiple-sampling values of step 840. When image sensor 700 uses a noise-optimized skipper multiple sampling scheme, this weighed sum may be used as the first term of equation (7), ($\Sigma_{i=1}^N \alpha_i X_i$). Method 1200 includes steps 1111, 1112, 1230, 1240, and 1250. In embodiments, method 1200 is implemented within one or more aspects of image sensor 700. Steps 1111 and 1112 are described above with the description of method 1100.

Step 1230 includes storing, in a memory, a cumulative weighted-sample equal to a product of (i) a difference between the first reset-sample and the first signal-sample, and (ii) a first sample-weight of the plurality of N sample-weights. In example of step 1230, image sensor 700 stores, in memory 708, a cumulative weighted-signal-sample $D_1$ equal to a product of (i) a difference between reset-sample 712(1) and signal-sample 714(1) and (ii) sample-weight 747(1), e.g., $\alpha_1^*$ of equation (19). Expressed mathematically, $D_1 = \alpha_1^*(Z(t_{R-i}) - Z(t_{S-i}))$.

Step 1240 includes for each of the plurality of N reset-samples, N signal-samples, and N sample-weights other than the first reset-sample, the first signal-sample and the first sample-weight, (i) reading the reset-sample and the signal-sample from the analog-to-digital converter, and (ii) increasing the cumulative weighted-sample by a product of (a) a difference between the reset-sample and the signal-sample and (b) the sample-weight. In an example of step 1240, for each reset-sample 712(i=2, 3, . . . , N), circuitry 706 (i) reads reset-sample 712(i) and signal-sample 714(i) from the analog-to-digital converter of peripheral circuitry 704, and (ii) increases the cumulative weighted-sample D by (a) a difference between reset-sample 712(i) and signal-sample 714(i) and (b) sample-weight 747(i), e.g., $\alpha_i^*$ of equation (19). Expressed mathematically, $D_{i \geq 1} = D_{i-1} + \alpha_1^*(Z(t_{R-i}) - Z(t_{S-i}))$, $D_0 = 0$. After iteratively executing step 1240 a total of (N−1) times, the resulting cumulative weighted-signal-sample is $D_N$.

Step 1250 includes determining the weighted sum as a quotient of (i) the cumulative weighted-sample and (ii) a product of N and a conversion gain of the pixel. In an example of step 1250, estimator 728 determines $(\Sigma_{i=1}^{N} \alpha_i X_i)$ of equation (7) as equal to $D_N/(N \cdot A_V)$.

Combinations of Features

Features described above as well as those claimed below may be combined in various ways without departing from the scope hereof. The following enumerated examples illustrate some possible, non-limiting combinations:

(A1) A method for estimating a signal charge collected by a pixel of an image sensor includes: determining an average bias that depends on the pixel's floating-diffusion dark current and pixel-sampling period; and determining a signal-charge estimate as the average bias subtracted from a difference between a weighted sum of a plurality of N multiple-sampling values each multiplied by a respective one of a plurality of N sample-weights. The plurality of N optimal sample-weights may at least one of (i) collectively minimize an expected value of the signal-charge estimate squared and (ii) sum to unity.

(A2) Embodiments of method (A1) further include determining the plurality of N sample-weights, as a plurality of N optimal sample-weights, by: solving a system of linear equations that are expressible as a product of (i) a matrix that includes a covariance matrix of the plurality of N multiple-sampling values and (ii) a vector that includes the plurality of N optimal sample-weights. The plurality of N optimal sample-weights (i) collectively minimize an expected value of the signal-charge estimate squared and (ii) sum to unity. Solving the system of linear equations may include inverting the matrix.

(A3) In embodiments of either one of methods (A1) or (A2), each of the plurality of multiple-sampling values is proportional to a difference between (i) a respective one of a plurality of N reset-samples output by the pixel and (ii) a respective one of a plurality of N signal-samples output by the pixel.

(A4) In embodiments of any one of methods (A1)-(A3) the method further includes determining the read-noise component as a weighted sum of Lorentzian noise sources each having a respective time-constant.

(A5) In embodiments of any one of methods (A1)-(A4) the method further includes determining values of (i) each of the respective noise-weights, (ii) each of the respective time-constants, and (iii) the floating-diffusion dark current that minimize a sum of a plurality of differences between (a) the sample variance of the plurality of N multiple-sampling values and (b) a model-based sample-variance that depends on the read-noise component, each of the plurality of differences corresponding to a respective time delay between samples.

(A6) In embodiments of any one of methods (A1)-(A5), the method includes determining each of the respective time-constants independently of the sum of the plurality of differences.

(A7) In embodiments of any one of methods (A1)-(A6) the method further includes determining the plurality of N sample-weights, as a plurality of N optimal sample-weights, by: determining, for each pair of multiple-sampling values of the plurality of N multiple-sampling values, a respective covariance of the pair of multiple-sampling values that depends on the noise-weight set and the floating-diffusion dark current; and inverting a matrix that includes a matrix of the covariances, wherein the plurality of N optimal sample-weights (i) collectively minimize an expected value of the signal-charge estimate squared and (ii) sum to unity.

(A8) Embodiments of any one of methods (A1)-(A7) further include, for each of a plurality of additional pixels of the image sensor, repeating the method of embodiment (A5) to yield a plurality of additional noise-weight sets and a plurality of additional floating-diffusion dark currents. The method includes for each of a plurality of additional pixels of the image sensor, repeating the method of claim 5 to yield a plurality of additional noise-weight sets and a plurality of additional floating-diffusion dark currents; averaging each of the noise-weight set and the plurality of additional noise-weight sets to yield an average noise-weight set; and averaging the floating-diffusion dark current and the plurality of additional floating-diffusion dark currents to yield an average floating-diffusion dark current and a mean-square floating-diffusion dark current.

(A9) Embodiments of any one of methods (A1)-(A8) further include determining the plurality of N sample-weights, as a plurality of N optimal sample-weights, by: determining, for each pair of multiple-sampling values of the plurality of N multiple-sampling values, a covariance of the pair of multiple-sampling values that depends on the average noise-weight set, the average floating-diffusion dark current. and the mean-square floating-diffusion dark current; and inverting a matrix that includes a matrix of the covariances, wherein the plurality of N optimal sample-weights (i) collectively minimize an expected value of the signal-charge estimate squared and (ii) sum to unity.

(A10) Embodiments of any one of methods (A1)-(A9) further include determining the average bias from the floating-diffusion dark current and the pixel-sampling period.

(A11) Embodiments of any one of methods (A1)-(A10) further include determining the weighted sum of the plurality of N multiple-sampling values by: reading a first reset-sample of the plurality of N reset-samples from an analog-to-digital converter of the image sensor; storing, in a memory, a cumulative weighted-reset-sample equal to a product of (i) the first reset-sample and (ii) a first sample-weight of the plurality of N sample-weights; for each reset-sample and sample-weight of the plurality of N reset-samples and N sample-weights other than the first reset-sample and the first sample-weight, (i) reading the reset-sample from the analog-to-digital converter, and (ii) increasing the cumulative weighted-reset-sample by a product of the reset-sample and the sample-weight; reading a first signal-sample of the plurality of N reset-samples from the analog-to-digital converter; storing, in a memory, a cumulative weighted-signal-sample equal to a product of (i) the first signal-sample and (ii) the first sample-weight of the plurality of N sample-weights; for each signal-sample and sample-weight of the plurality of N signal-samples and N sample-weights other than the first signal-sample and first sample-weight, (i) reading the signal-sample from the analog-to-digital converter, and (ii) increasing the cumulative weighted-signal-sample by a product of the signal-sample and the sample-weight; and determining the weighted sum as a quotient of (i) a difference between the cumulative weighted-reset-sample and the cumulative weighted-signal-sample and (ii) a product of N and a conversion gain of the pixel.

(A12) Embodiments of any one of methods (A1)-(A11) further include determining the weighted sum of the plurality of N multiple-sampling values by: reading a first reset-sample of the plurality of N reset-samples from an analog-to-digital converter of the image sensor; reading a first signal-sample of the plurality of N reset-samples from the analog-to-digital converter; storing, in a memory, a cumulative weighted-sample equal to a product of (i) a difference between the first reset-sample and the first signal-sample, and (ii) a first sample-weight of the plurality of N sample-weights; and for each of the plurality of N reset-samples, N signal-samples, and N sample-weights other than the first reset-sample, the first signal-sample and the first sample-weight, (i) reading the reset-sample and the signal-sample from the analog-to-digital converter, and (ii) increasing the cumulative weighted-sample by a product of (a) a difference between the reset-sample and the signal-sample and (b) the sample-weight; and determining the weighted sum as a quotient of (i) the cumulative weighted-sample and (ii) a product of N and a conversion gain of the pixel.

(B1) An image sensor includes a pixel array and circuitry communicatively coupled to the pixel array. The circuity estimates a signal charge collected by a pixel of the pixel array by executing the method of any one of embodiments (A1)-(A12).

(B2) In embodiments of image sensor (B1), the circuitry includes one of an application-specific integrated circuit and a field-programmable gate array.

(B3) In embodiments of either one of image sensors (B1) or (B2), the circuitry includes a processor and a memory. The memory stores machine-readable instructions that, when executed by the processor, cause the processor to estimate a signal charge collected by a pixel of the pixel array by executing method of any one of methods (A1)-(A12).

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method for estimating a signal charge collected by a pixel of an image sensor, comprising: determining an average bias that depends on the pixel's floating-diffusion dark current and pixel-sampling period; determining a plurality of N sample-weights, as a plurality of N optimal sample-weights by solving a system of linear equations that are expressible as a product of (i) a matrix that includes a covariance matrix of a plurality of N multiple-sampling values and (ii) a vector that includes the plurality of N optimal sample-weights, wherein N is a positive integer greater than one; and determining a signal-charge estimate as the average bias subtracted from a difference between a weighted sum of the plurality of N multiple-sampling values each multiplied by a respective one of the plurality of N sample-weights that (i) collectively minimize an expected value of the signal-charge estimate squared and (ii) sum to unity.

2. The method of claim 1, wherein solving the system of linear equations includes inverting the matrix.

3. A method for estimating a signal charge collected by a pixel of an image sensor, comprising: determining an average bias that depends on the pixel's floating-diffusion dark current and pixel-sampling period; determining a signal-charge estimate as the average bias subtracted from a difference between a weighted sum of a plurality of N multiple-sampling values each multiplied by a respective one of a plurality of N sample-weights that (i) collectively minimize an expected value of the signal-charge estimate squared and (ii) sum to unity wherein N is a positive integer greater than one, each of the plurality of multiple-sampling values being proportional to a difference between (i) a respective one of a plurality of N reset-samples output by the pixel and (ii) a respective one of a plurality of N signal-samples output by the pixel, each of the plurality of N reset-samples including a read-noise component, and further comprising: determining the read-noise component as a weighted sum of Lorentzian noise sources each having a respective time-constant.

4. The method of claim 3, each term of the weighted sum of Lorentzian noise sources including a respective noise-weight of a noise-weight set, and further comprising:
determining values of (i) each of the respective noise-weights, (ii) each of the respective time-constants, and (iii) the floating-diffusion dark current that minimize a sum of a plurality of differences between (a) the sample variance of the plurality of N multiple-sampling values and (b) a model-based sample-variance that depends on the read-noise component, each of the plurality of differences corresponding to a respective time delay between samples.

5. The method of claim 4, said determining values comprising, before determining each of the respective noise-weights and the floating-diffusion dark current:
determining each of the respective time-constants independently of the sum of the plurality of differences.

6. The method of claim 4, further comprising determining the plurality of N sample-weights, as a plurality of N optimal sample-weights, by:
determining, for each pair of multiple-sampling values of the plurality of N multiple-sampling values, a respective covariance of the pair of multiple-sampling values that depends on the noise-weight set and the floating-diffusion dark current; and inverting a matrix that includes a matrix of the covariances, wherein the plurality of N optimal sample-weights (i) collectively minimize an expected value of the signal-charge estimate squared and (ii) sum to unity.

7. The method of claim 4, further comprising:

for each of a plurality of additional pixels of the image sensor, repeating the method of claim 6 to yield a plurality of additional noise-weight sets and a plurality of additional floating-diffusion dark currents;

averaging each of the noise-weight set and the plurality of additional noise-weight sets to yield an average noise-weight set; and averaging the floating-diffusion dark current and the plurality of additional floating-diffusion dark currents to yield an average floating-diffusion dark current and a mean-square floating-diffusion dark current.

8. The method of claim 7, further comprising determining the plurality of N sample-weights, as a plurality of N optimal sample-weights, by:

determining, for each pair of multiple-sampling values of the plurality of N multiple-sampling values, a covariance of the pair of multiple-sampling values that depends on the average noise-weight set, the average floating-diffusion dark current. and the mean-square floating-diffusion dark current; and inverting a matrix that includes a matrix of the covariances, wherein the plurality of N optimal sample-weights (i) collectively minimize an expected value of the signal-charge estimate squared and (ii) sum to unity.

9. The method of claim 4, further comprising:

determining the average bias from the floating-diffusion dark current and the pixel-sampling period.

10. The method of claim 3, further comprising determining the weighted sum of the plurality of N multiple-sampling values by:

reading a first reset-sample of the plurality of N reset-samples from an analog-to-digital converter of the image sensor;

storing, in a memory, a cumulative weighted-reset-sample equal to a product of (i) the first reset-sample and (ii) a first sample-weight of the plurality of N sample-weights;

for each reset-sample and sample-weight of the plurality of N reset-samples and N sample-weights other than the first reset-sample and the first sample-weight, (i) reading the reset-sample from the analog-to-digital converter, and (ii) increasing the cumulative weighted-reset-sample by a product of the reset-sample and the sample-weight;

reading a first signal-sample of the plurality of N reset-samples from the analog-to-digital converter;

storing, in a memory, a cumulative weighted-signal-sample equal to a product of (i) the first signal-sample and (ii) the first sample-weight of the plurality of N sample-weights;

for each signal-sample and sample-weight of the plurality of N signal-samples and N sample-weights other than the first signal-sample and first sample-weight, (i) reading the signal-sample from the analog-to-digital converter, and (ii) increasing the cumulative weighted-signal-sample by a product of the signal-sample and the sample-weight; and determining the weighted sum as a quotient of (i) a difference between the cumulative weighted-reset-sample and the cumulative weighted-signal-sample and (ii) a product of N and a conversion gain of the pixel.

11. The method of claim 3, further comprising determining the weighted sum of the plurality of N multiple-sampling values by:

reading a first reset-sample of the plurality of N reset-samples from an analog-to-digital converter of the image sensor;

reading a first signal-sample of the plurality of N reset-samples from the analog-to-digital converter;

storing, in a memory, a cumulative weighted-sample equal to a product of (i) a difference between the first reset-sample and the first signal-sample, and (ii) a first sample-weight of the plurality of N sample-weights;

for each of the plurality of N reset-samples, N signal-samples, and N sample-weights other than the first reset-sample, the first signal-sample and the first sample-weight, (i) reading the reset-sample and the signal-sample from the analog-to-digital converter, and (ii) increasing the cumulative weighted-sample by a product of (a) a difference between the reset-sample and the signal-sample and (b) the sample-weight; and determining the weighted sum as a quotient of (i) the cumulative weighted-sample and (ii) a product of N and a conversion gain of the pixel.

12. An image sensor comprising:

a pixel array; and circuitry, communicatively coupled to the pixel array, that estimates a signal charge collected by a pixel of the pixel array by executing the method of claim 1.

13. The image sensor of claim 12, the circuitry including one of an application-specific integrated circuit and a field-programmable gate array.

14. The image sensor of claim 12, the circuitry comprising:

a processor; and a memory storing machine-readable instructions that, when executed by the processor, cause the processor to estimate a signal charge collected by a pixel of the pixel array by executing method of claim 1.

15. An image sensor comprising:

a pixel array; and circuitry, communicatively coupled to the pixel array, that estimates a signal charge collected by a pixel of the pixel array by executing the method of claim 3.

16. The image sensor of claim 15, the circuitry including one of an application-specific integrated circuit and a field-programmable gate array.

17. The image sensor of claim 15, the circuitry comprising:

a processor; and a memory storing machine-readable instructions that, when executed by the processor, cause the processor to estimate a signal charge collected by a pixel of the pixel array by executing method of claim 3.

* * * * *